United States Patent
Ozturk et al.

(10) Patent No.: US 8,514,779 B2
(45) Date of Patent: *Aug. 20, 2013

(54) RADIO LINK CONTROL PROTOCOL DATA UNIT SIZE SELECTION IN DUAL CARRIER HSUPA

(75) Inventors: Ozcan Ozturk, San Diego, CA (US); Sharad Deepak Sambhwani, San Diego, CA (US); Rohit Kapoor, San Diego, CA (US); Aziz Gholmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 560 days.

This patent is subject to a terminal disclaimer.

(21) Appl. No.: 12/758,217

(22) Filed: Apr. 12, 2010

(65) Prior Publication Data

US 2011/0090806 A1   Apr. 21, 2011

Related U.S. Application Data

(60) Provisional application No. 61/168,911, filed on Apr. 13, 2009.

(51) Int. Cl.
*H04W 4/00* (2009.01)
(52) U.S. Cl.
USPC .......................................... 370/328
(58) Field of Classification Search
USPC .............. 370/310, 320, 326, 321, 319, 330, 370/335, 336, 328, 329, 310.2, 332, 252, 370/342, 465
See application file for complete search history.

(56) References Cited

U.S. PATENT DOCUMENTS

| | | | | |
|---|---|---|---|---|
| 7,161,916 B2 * | 1/2007 | Malladi et al. | | 370/332 |
| 8,031,600 B2 * | 10/2011 | Wu | | 370/231 |
| 8,045,994 B2 * | 10/2011 | Ericson et al. | | 455/452.2 |
| 8,094,682 B2 * | 1/2012 | Pani et al. | | 370/474 |
| 8,279,890 B2 * | 10/2012 | Marinier et al. | | 370/465 |
| 2004/0218683 A1 * | 11/2004 | Batra et al. | | 375/261 |
| 2009/0086709 A1 * | 4/2009 | Pani et al. | | 370/349 |
| 2009/0103511 A1 * | 4/2009 | Marinier et al. | | 370/345 |

FOREIGN PATENT DOCUMENTS

| | | |
|---|---|---|
| EP | 1255368 A1 | 11/2002 |
| JP | 2009188739 A | 8/2009 |
| JP | 2010541410 A | 12/2010 |
| JP | 2010541424 A | 12/2010 |
| WO | WO2008094662 | 8/2008 |
| WO | 2009045882 A2 | 4/2009 |
| WO | 2009045913 A2 | 4/2009 |

OTHER PUBLICATIONS

International Search Report and Written Opinion—PCT/US2010/030831, International Search Authority—European Patent Office—Oct. 14, 2010.

(Continued)

*Primary Examiner* — Anh Ngoc Nguyen
(74) *Attorney, Agent, or Firm* — Darren Simon

(57) ABSTRACT

A method for using a flexible size radio link control (RLC) protocol data unit (PDU) on an uplink is described. A request for an RLC PDU is received from a medium access control (MAC) layer. Radio conditions for a first uplink carrier and a second uplink carrier are determined. A size of the RLC PDU is selected based on the radio conditions. The RLC PDU is generated. The RLC PDU is sent to the MAC layer.

54 Claims, 15 Drawing Sheets

(56) References Cited

OTHER PUBLICATIONS

Huawei "Considertonson scheduling control for DC-HSUPA", 3GPP TSG RAN WG2 Meeting #65bis R2-092289, 3GPP, pp. 1-3, Mar. 18, 2009.

Qualcomm Europe (Rapporteur), "RAN1 findings of the UTRA Multi-Carrier Evolution study", 3GPP TSG-RAN Meeting #43 RP-090318, 3GPP, pp. 1-3, Mar. 4, 2009.

Taiwan Search Report—TW099111500—TIPO—Mar. 17, 2013.

\* cited by examiner

RADIO LINK CONTROL PROTOCOL DATA UNIT SIZE SELECTION IN DUAL CARRIER HSUPA

RELATED APPLICATIONS

This application is related to and claims priority from U.S. Provisional Patent Application Ser. No. 61/168,911 filed Apr. 13, 2009, for "RLC PDU Size Selection in Dual Carrier HSUPA."

TECHNICAL FIELD

The present disclosure relates generally to communication systems. More specifically, the present disclosure relates to systems and methods for radio link control protocol data unit size selection in dual carrier high speed uplink packet access (HSUPA).

BACKGROUND

Wireless communication systems are widely deployed to provide various types of communication content such as voice, video, data, and so on. These systems may be multiple-access systems capable of supporting simultaneous communication of multiple terminals with one or more base stations.

In the wireless communication network, data may be transmitted between a mobile station and a base station. The data may be transmitted in the form of one or more data packets. A data packet may include data and appropriate data headers.

As wireless communication systems continue to expand and evolve, the need for higher data rates continues to increase. Data rates may be improved by increasing the efficiency of data transmitted between the mobile station and the base station. Data rates may also be improved by the introduction of additional carriers for data transmitted between the mobile station and the base station. It would be beneficial if improvements were made relating to the communication of data packets when multiple carriers are used.

DETAILED DESCRIPTION

Figure 1:
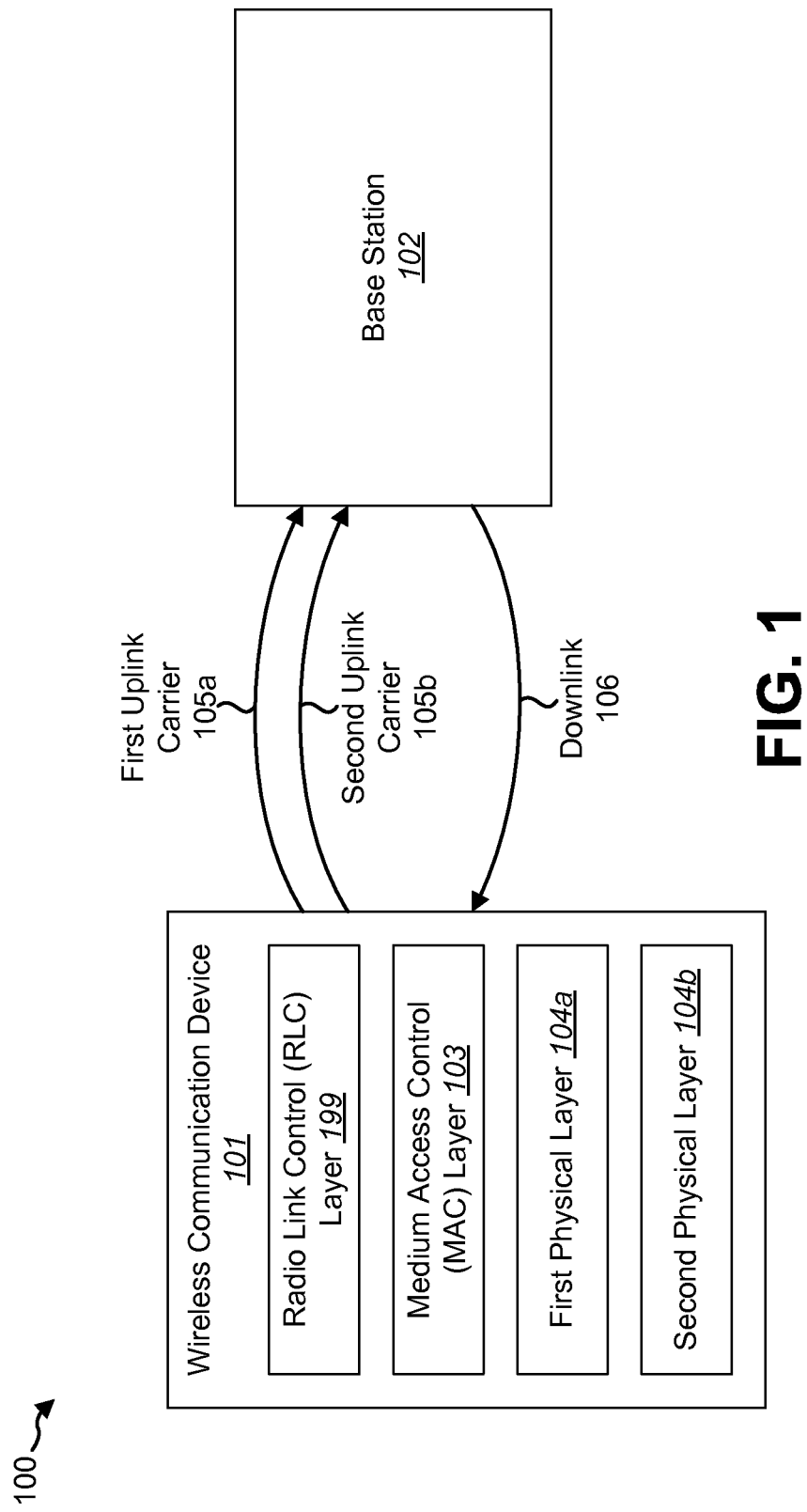
FIG. 1 shows a wireless communication system with multiple wireless devices.

A method for using a flexible size radio link control (RLC) protocol data unit (PDU) on an uplink is described. A request for an RLC PDU is received from a medium access control (MAC) layer or the RLC PDU is generated to be transmitted later. Radio conditions are determined for a first uplink carrier and a second uplink carrier. A size of the RLC PDU is selected based on the radio conditions. The RLC PDU is generated. The RLC PDU is sent to the MAC layer.

It may be determined whether the RLC PDU is to be transmitted via the first uplink carrier or the second uplink carrier. The RLC PDU may be transmitted via the determined uplink carrier. A size of a physical layer packet data field may be determined. The method may be performed by a wireless communication device. It may be determined whether the wireless communication device is capable of forming an RLC PDU at a given transmission time interval (TTI) with enhanced dedicated channels (EDCH) Transport Format Combination (E-TFC) selection.

The wireless communication device may be capable of forming an RLC PDU at a given TTI with E-TFC selection. The size of the RLC PDU may be selected to match data requested, which is determined by the channel conditions and grants at this TTI. The wireless communication device may not be capable of forming an RLC PDU at a given TTI with E-TFC selection. It may be determined whether a size of a pre-generated RLC PDU is based on channel conditions and grants.

The size of the pre-generated RLC PDU may be based on channel conditions and grants. Selecting a size of the RLC PDU may include selecting the size of the RLC PDU as a function of the radio conditions for the first uplink carrier and the second uplink carrier. Generating the RLC PDU may include pre-generating the RLC PDU for a future TTI. The size of the pre-generated RLC PDU may not be based on channel conditions and grants. Selecting a size of the RLC PDU may include selecting the size of the RLC PDU to minimize segmentation and under-utilization.

Selecting the size of the RLC PDU may include selecting the size of the RLC PDU data field to be equal to the size of the physical layer packet data field minus physical layer headers and MAC layer headers. The size of the RLC PDU data field may also restricted by the maximum amount of data allowed to be transmitted by an applicable current grant for a current transmission time interval (TTI). Selecting the size of the RLC PDU may include selecting a size of a later RLC PDU for a later time unit to match a physical layer packet size of a current time unit.

The radio conditions may include channel variations or an available grant. The E-TFC may be a MAC-i/is entity or a MAC-e/es entity. The size of the RLC PDU may be selected using $K*\min(x1(t), x2(t))$. K may be equal to 1. $x1(t)$ may be the packet size corresponding to a serving grant for the first uplink carrier at time t. x2(t) may be the packet size corresponding to a serving grant for the second uplink carrier at time t.

An apparatus for using a flexible size radio link control (RLC) protocol data unit (PDU) on an uplink is also described. The apparatus includes means for receiving a request for an RLC PDU from a medium access control (MAC) layer. The apparatus also includes means for determining radio conditions for a first uplink carrier and a second uplink carrier. The apparatus further includes means for selecting a size of the RLC PDU based on the radio conditions. The apparatus also includes means for generating the RLC PDU. The apparatus further includes means for sending the RLC PDU to the MAC layer.

An apparatus for using a flexible size radio link control (RLC) protocol data unit (PDU) on an uplink is described. The apparatus includes circuitry configured to receive a request for an RLC PDU from a medium access control (MAC) layer, to determine radio conditions for a first uplink carrier and a second uplink carrier, to select a size of the RLC PDU based on the radio conditions, to generate the RLC PDU, and to send the RLC PDU to the MAC layer.

A computer-program product for using a flexible size radio link control (RLC) protocol data unit (PDU) on an uplink is also described. The computer-program product includes a computer-readable medium having instructions thereon. The instructions include code for receiving a request for an RLC PDU from a medium access control (MAC) layer. The instructions also include code for determining radio conditions for a first uplink carrier and a second uplink carrier. The instructions further include code for selecting a size of the RLC PDU based on the radio conditions. The instructions also include code for generating the RLC PDU. The instructions further include code for sending the RLC PDU to the MAC layer.

In older $3^{rd}$ Generation Partnership Project (3GPP) releases, only fixed radio link control (RLC) packet sizes were allowed. Although newer releases have allowed flexible RLC packet sizes on the downlink, the standards have not imposed a dynamic selection mechanism according to the channel variations for the size of the RLC packet which is generated at the RLC layer.

By using a flexible size RLC protocol data unit (PDU) on the uplink, important parameters such as the residual error may be reduced or minimized while maintaining some degree of lower header overhead gain. By adjusting the RLC PDU size selection on the uplink according to radio conditions, a wireless communication device may minimize overhead and error.

In a fully radio aware method, the wireless communication device may select the size of the RLC PDU so that exactly one RLC PDU is transmitted in a physical layer packet. An RLC PDU is then generated to fit in a medium access channel (MAC) PDU assuming that the traffic buffer has enough data. The first benefit of this is that the RLC PDU is not segmented at the MAC layer and thus, the residual error for the first RLC transmission is the same as the physical layer error. The second benefit is that RLC and MAC header overhead is minimized by sending only one RLC packet in a MAC packet.

In a partially radio aware method, the RLC PDU size depends on the radio conditions at the generation of the PDU. However, the RLC PDU size is not chosen at the exact time when the physical layer packet size is determined. Instead, the RLC PDU size may be selected during preceding time units. The RLC PDU size may be based on the number of uplink carriers available and the channel parameters corresponding to each of the uplink carriers. In the partially radio aware method, the size of the RLC PDU is selected prior to the physical layer packet size determination. The RLC PDU may also be generated prior to the physical layer packet size determination. Once an RLC PDU has been generated, the RLC PDU stays in the RLC transmission buffer until it is transmitted by the MAC layer.

In the following description, for reasons of conciseness and clarity, terminology associated with the Universal Mobile Telecommunications System (UMTS) standards, as promulgated under the 3rd Generation Partnership Project (3GPP) by the International Telecommunication Union (ITU), is used. It should be noted that the invention is also applicable to other technologies, such as technologies and the associated standards related to Code Division Multiple Access (CDMA), Time Division Multiple Access (TDMA), Frequency Division Multiple Access (FDMA), Orthogonal Frequency Division Multiple Access (OFDMA) and so forth. Terminologies associated with different technologies can vary. For example, depending on the technology considered, a wireless device can sometimes be called a user equipment (UE), a mobile station, a mobile terminal, a subscriber unit, an access terminal, etc., to name just a few. Likewise, a base station can sometimes be called an access point, a Node B, an evolved Node B, and so forth. It should be noted that different terminologies apply to different technologies when applicable.

The 3rd Generation Partnership Project (3GPP) is a collaboration agreement that was established in December 1998. It is a cooperation between the Association of Radio Industries and Businesses/Telecommunication Technology Committee (ARIB/TTC) (Japan), the European Telecommunications Standards Institute (ETSI) (Europe), the Alliance for Telecommunications Industry Solutions (ATIS) (North America), the China Communications Standards Association (CCSA) (China) and the Telecommunication Technology Association of Korea (TTA) (South Korea). The scope of 3GPP is to make a third generation (3G) mobile phone system specification within the scope of the International Telecommunication Union's (ITU) IMT-2000 (International Mobile Communications) project globally applicable. 3GPP specifications are based on evolved Global System for Mobile Communications (GSM) specifications, which are generally known as the Universal Mobile Telecommunications System (UMTS). 3GPP standards are structured as releases. Discussion of 3GPP thus frequently refers to the functionality in one release or another. For example, Release 99 specifies the first UMTS third generation (3G) networks, incorporating a CDMA air interface. Release 6 integrates operation with wireless local area networks (LAN) networks and adds High Speed Uplink Packet Access (HSUPA). Release 8 introduces dual downlink carriers and Release 9 extends dual carrier operation to uplink for UMTS.

FIG. 1 shows a wireless communication system 100 with multiple wireless devices. A wireless device may be a base station 102, a wireless communication device 101, a controller, or the like. A base station 102 is a station that communicates with one or more wireless communication devices 101. A base station 102 may also be referred to as, and may include some or all of the functionality of, an access point, a broadcast transmitter, a Node B, an evolved Node B, etc. Each base station 102 provides communication coverage for a particular geographic area. A base station 102 may provide communication coverage for one or more wireless communication devices 101. The term "cell" can refer to a base station 102 and/or its coverage area depending on the context in which the term is used. Each cell may be further divided into sectors. A base station 102 may thus cover multiple sectors.

A wireless communication device 101 may also be referred to as, and may include some or all of the functionality of, a terminal, an access terminal, a user equipment (UE), a subscriber unit, a station, etc. A wireless communication device 101 may be a cellular phone, a personal digital assistant (PDA), a wireless device, a wireless modem, a handheld device, a laptop computer, a PC card, compact flash, an external or internal modem, a wireline phone, etc. A wireless communication device 101 may be mobile or stationary. A wireless communication device 101 may communicate with zero, one, or multiple base stations 102 on a downlink 106 and/or an uplink 105 at any given moment. The downlink 106 (or forward link) refers to the communication link from a base station 102 to a wireless communication device 101, and the uplink 105 (or reverse link) refers to the communication link from a wireless communication device 101 to a base station 102. Uplink 105 and downlink 106 may refer to the communication link or to the carriers used for the communication link.

A wireless communication device 101 that has established an active traffic channel connection with one or more base stations 102 is called an active wireless communication device 101 and is said to be in a traffic state. A wireless communication device 101 that is in the process of establishing an active traffic channel connection with one or more base stations 102 is said to be in a connection setup state. A wireless communication device 101 may be any data device that communicates through a wireless channel or through a wired channel, for example using fiber optic or coaxial cables.

The wireless communication system 100 may be a multiple-access system capable of supporting communication with multiple wireless communication devices 101 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems and spatial division multiple access (SDMA) systems.

The wireless communication system 100 may use the High Speed Packet Access (HSPA) mobile telephony protocol as defined in the 3GPP standards. HSPA may improve the performance of W-CDMA protocols. In HSPA, a shorter Transmission Time Interval (TTI) may be used. 3GPP Release 8 allows flexible packet sizes for radio link control (RLC) packets on the High Speed Uplink Packet Access (HSUPA) portion of HSPA. This makes it possible for the wireless communication device 101 to choose the size of the radio link control (RLC) protocol data unit (PDU) according to radio conditions (e.g., channel variation, grants received).

The wireless communication system may also use dual carrier high speed uplink packet access (DC-HSUPA) mobile telephony protocol. DC-HSUPA is an evolution of high speed packet access (HSPA) by means of carrier aggregation in the uplink 105. To achieve better resource utilization and spectrum efficiency, the bandwidth utilized for uplink 105 may be doubled by using both a first uplink carrier 105a and a second uplink carrier 105b. Each of the uplink carriers 105 may use a 5 megahertz (MHz) bandwidth. Thus, the effective bandwidth of both of the uplink carriers 105 may be 10 MHz. The serving grants may be different on each uplink carrier 105 since the channel conditions and system loadings vary across carriers.

In previous $3^{rd}$ Generation Partnership Project (3GPP) releases, only fixed sizes for radio link control (RLC) packets were allowed. Although Release 7 allowed flexible sizes on the downlink 106, the standard did not impose a dynamic size selection mechanism according to the channel variation since the physical layer and the radio link control (RLC) layer reside on different network elements. On the uplink 105, this is more feasible since both the radio link control (RLC) layer 199 and layers below reside at the wireless communication device 101.

In 3GPP Release 8, an uplink peak data bit throughput using acknowledged-mode RLC may be limited by the size of the RLC PDU. To deal with this problem, flexible RLC PDU sizes are used to improve uplink coverage and reduce the RLC roundtrip time (RTT), thereby reducing processing and level-2 (MAC and RLC) overhead, and effectively reducing the size of the RLC window. The ability of a wireless communication device 101 to flexibly select the size of RLC PDUs may help to reduce level-2 protocol overhead by reducing padding as well as the number of RLC and MAC headers required. It may also reduce the residual error seen by an RLC packet by minimizing segmentation. In addition, the use of larger PDUs means that both the wireless communication device 101 and the base station 102 process fewer PDUs, reducing the processing power of the wireless communication device 101 and the base station 102 dedicated to processing PDUs.

The wireless communication device 101 may include a first physical layer 104a and a second physical layer 104b. A physical layer 104 may include hardware transmission technologies for the wireless communication network 100. For example, a physical layer 104 may include a radio interface allowing wireless communication with a base station 102. Each physical layer 104 may correspond to an uplink carrier 105. For example, the first physical layer 104a may correspond to the first uplink carrier 105a and the second physical layer 104b may correspond to the second uplink carrier 105b. A physical layer 104 may interface with a medium access control (MAC) layer 103 on the wireless communication device 101. The medium access control (MAC) layer 103 may provide addressing and channel access control mechanisms that facilitate communication with the base station 102 in the wireless communication network 100. The medium access control (MAC) layer 103 may interface with a radio link control (RLC) layer 199 on the wireless communication device 101. The radio link control (RLC) layer 199 may receive requests for data packets from the medium access control (MAC) layer 103. In response to these requests, the radio link control (RLC) layer 199 may provide data packets to the medium access control (MAC) layer 103.

Figure 2:
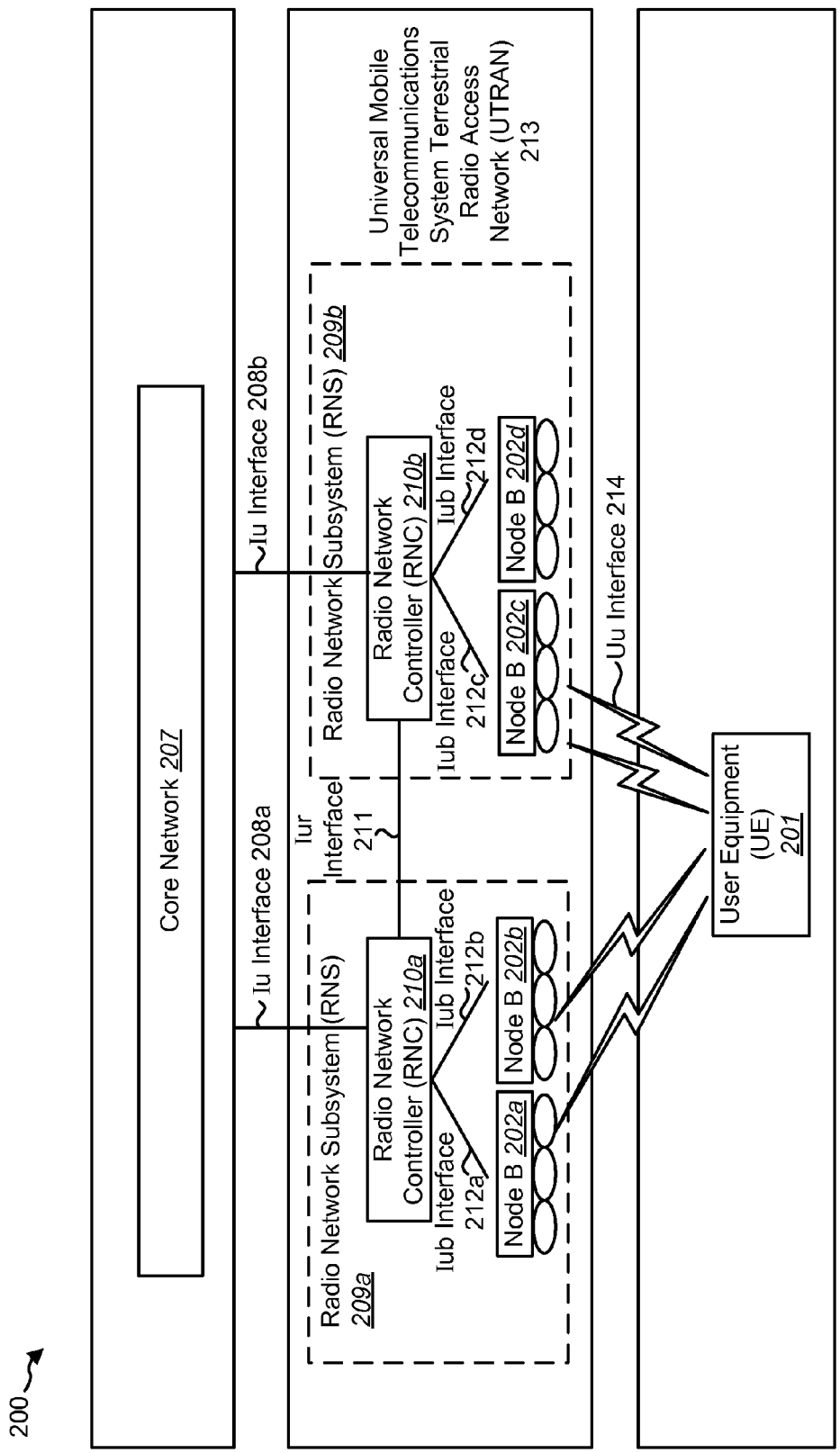
FIG. 2 is a block diagram illustrating a Universal Mobile Telecommunication System (UMTS)

FIG. 2 is a block diagram illustrating a Universal Mobile Telecommunication System (UMTS) 200. The Universal Mobile Telecommunications System (UMTS) 200 is one of the third-generation (3G) mobile telephone technologies (or $3^{rd}$ Generation Wireless Mobile Communication Technology). A Universal Mobile Telecommunication System (UMTS) 200 network may include a core network 207, a Universal Mobile Telecommunication System (UMTS) Terrestrial Radio Access Network (UTRAN) 213 and user equipment (UE) 201. The core network 207 provides routing, switching and transit for user traffic. A Global System for Mobile Communications (GSM) network with General Packet Radio Service (GPRS) is the basic core network 207 architecture that a Universal Mobile Telecommunication System (UMTS) 200 is based on.

In a Universal Mobile Telecommunication System (UMTS) 200, the Universal Mobile Telecommunication System (UMTS) terrestrial radio access network (UTRAN) 213 provides the air interface access methods for user equipment (UE) 201. A base station 102 may be referred to as a Node B 202 and control equipment for Node Bs 202 may be called a radio network controller (RNC) 210a-b. For an air interface, a Universal Mobile Telecommunication System (UMTS) 200 most commonly uses a wideband spread-spectrum mobile air interface known as wideband code division multiple access (W-CDMA). W-CDMA uses a direct sequence code division multiple access (CDMA) signaling method to separate users.

A Universal Mobile Telecommunication System (UMTS) Terrestrial Radio Access Network (UTRAN) 213 is a collective term for the Node Bs 202a-d (or base stations) and the control equipment for the Node Bs 202 (such as the radio network controllers (RNC) 210) that make up the Universal Mobile Telecommunication System (UMTS) 200 radio access network. The Universal Mobile Telecommunication System (UMTS) 200 radio network is a 3G communications network that can carry both real-time circuit switched and internet protocol (IP) based packet switched traffic types. The radio network controller (RNC) 210 provides control functionalities for one or more Node Bs 202. Connectivity is provided between the user equipment (UE) 201 and the core network 207 by the Universal Mobile Telecommunication System (UMTS) Terrestrial Radio Access Network (UTRAN) 213.

The Universal Mobile Telecommunication System (UMTS) Terrestrial Radio Access Network (UTRAN) 213 is connected internally or externally to other functional entities by four interfaces: the Iu interface 208a-b, the Uu interface 214, the Iub interface 212a-d and the Iur interface 211. The Universal Mobile Telecommunication System (UMTS) Terrestrial Radio Access Network (UTRAN) 213 is attached to a GSM core network 207 via an external interface called the Iu interface 208. A radio network controller (RNC) 210 supports this interface. In addition, each radio network controller (RNC) 210 manages a set of Node Bs 202 through the Iub interfaces 212a-d. The Iur interface 211 connects two radio network controllers (RNCs) 210 with each other. The Universal Mobile Telecommunication System (UMTS) Terrestrial Radio Access Network (UTRAN) 213 is largely autonomous from the core network 207 since the radio network controllers (RNCs) 210 are interconnected by the Iur interface 211. The Uu interface 214 is also external and connects the Node B 202 with the user equipment (UE) 201, while the Iub interface 212 is an internal interface connecting the radio network controller (RNC) 210 with the Node B 202.

The radio network controller (RNC) 210 fills multiple roles. First, the radio network controller (RNC) 210 may control the admission of new mobiles or services attempting to use a Node B 202. Second, from the Node B 202 point of view, the radio network controller (RNC) 210 is a controlling radio network controller (RNC) 210. Controlling admission ensures that mobiles are allocated radio resources (bandwidth and signal/noise ratio) up to what the network has available. The radio network controller (RNC) 210 is where the Iub interface 212 from each Node B 202 terminates. From the user equipment (UE) 201 point of view, the radio network controller (RNC) 210 acts as a serving radio network controller (RNC) 210 that terminates the user equipment's (UE) 201 link layer communications. From the core network 207 point of view, the serving radio network controller (RNC) 210 terminates the Iu interface 208 for the user equipment (UE) 201. The serving radio network controller (RNC) 210 also controls the admission of new mobiles or services attempting to use the core network 207 over the Iu interface 208.

In the Universal Mobile Telecommunication System (UMTS) 200, universal terrestrial radio access (UTRA) frequency division duplex (FDD) channels and universal terrestrial radio access (UTRA) time division duplex (TDD) channels may be used to communicate data. Applying interference cancellation in Node Bs 202 will allow the Node Bs 202 to receive transmissions at higher data rates, i.e., interference cancellation can increase data rates and capacity on the uplink 105.

The radio network may be further connected to additional networks outside the radio network, such as a corporate intranet, the Internet, or a conventional public switched telephone network, and may transport data packets between each user equipment (UE) 201 device and such outside networks. The Node B 202 and radio network controller (RNC) 210 may be part of a Radio Network Subsystem (RNS) 209a-b.

Figure 3:
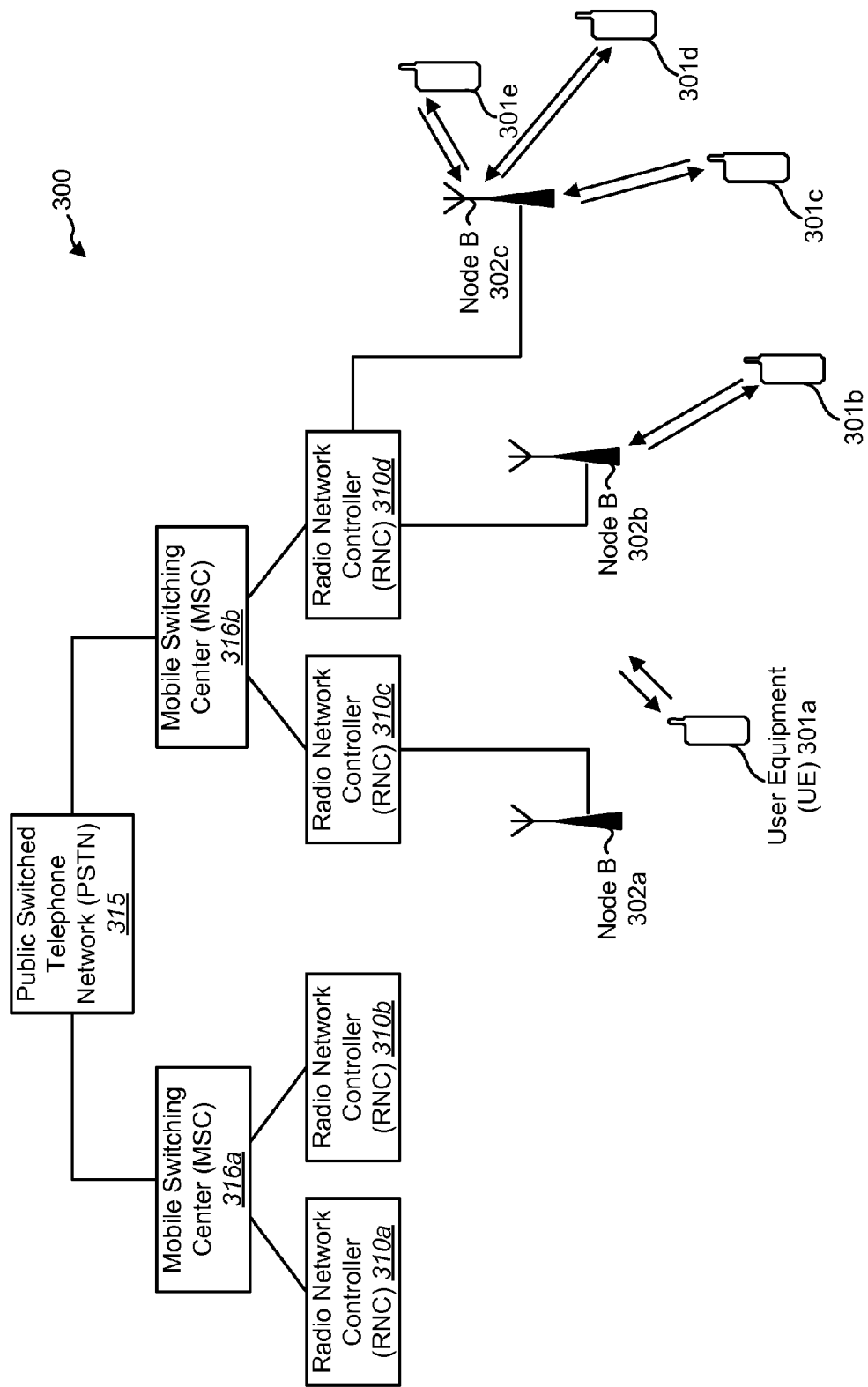
FIG. 3 illustrates selected components of a communication network, which includes a radio network controller (RNC) (or base station controller (BSC)) coupled to Node Bs (or base stations or wireless base transceiver stations)

FIG. 3 illustrates selected components of a communication network 300, which includes a radio network controller (RNC) 310 (or base station controller (BSC)) coupled to Node Bs 302 (or base stations or wireless base transceiver stations). The Node Bs 302a-c communicate with user equipment (UEs) 301a-e (or remote stations) through corresponding wireless connections. Each radio network controller (RNC) 310a-d provides control functionalities for one or more Node Bs 302. Each radio network controller (RNC) 310 is coupled to a public switched telephone network (PSTN) 315 through a mobile switching center (MSC) 316a-b. In another example, each radio network controller (RNC) 310 is coupled to a packet switched network (PSN) (not shown) through a packet data server node (PDSN) (not shown). Data interchange between various network elements, such as the radio network controller (RNC) 310 and a packet data server node, can be implemented using any number of protocols, for example, the Internet Protocol (IP), an asynchronous transfer mode (ATM) protocol, T1, E1, frame relay and other protocols.

For an air interface, a UMTS most commonly uses a wideband spread-spectrum mobile air interface known as wideband code division multiple access (or W-CDMA). W-CDMA uses a direct sequence code division multiple access signaling method (or CDMA) to separate users. W-CDMA (Wideband Code Division Multiple Access) is a third generation standard for mobile communications. W-CDMA evolved from GSM (Global System for Mobile Communications)/GPRS a second generation standard, which is oriented to voice communications with limited data capability. The first commercial deployments of W-CDMA are based on a version of the standards called W-CDMA Release 99.

The Release 99 specification defines two techniques to enable uplink packet data. Most commonly, data transmission is supported using either the Dedicated Channel (DCH) or the Random Access Channel (RACH). However, the DCH is the primary channel for support of packet data services. Each remote station uses an orthogonal variable spreading factor (OVSF) code. An OVSF code is an orthogonal code that facilitates uniquely identifying individual communication channels. In addition, micro diversity is supported using soft handover and closed loop power control is employed with the DCH.

Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate. Inherent in the design of direct sequence CDMA systems is the requirement that a receiver aligns its PN sequences to those of the Node B 302. Some systems, such as those defined by the W-CDMA standard, differentiate base stations using a unique PN code for each, known as a primary scrambling code. The W-CDMA standard defines two Gold code sequences for scrambling the downlink 106, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. The period of 38,400 chips is referred to as a radio frame. Each radio frame is divided into 15 equal sections referred to as slots. W-CDMA Node Bs 302 operate asynchronously in relation to each other, so knowledge of the frame timing of one Node B 302 does not translate into knowledge of the frame timing of any other Node B 302. In order to acquire this knowledge, W-CDMA systems use synchronization channels and a cell searching technique.

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink 106 and uplink 105, respectively. Release 7 HSPA+ uses three enhancements to improve data rate. First, Release 7 introduced support for 2×2 multiple-input and multiple-output (MIMO) channels on the downlink 106. With MIMO, the peak data rate supported on the downlink 106 is 28 megabits per second (Mbps). Second, higher order modulation is introduced on the downlink 106. The use of 64 quadrature amplitude modulation (QAM) on the downlink 106 allows peak data rates of 21 Mbps. Third, higher order modulation is introduced on the uplink 105. The use of 16 QAM on the uplink 105 allows peak data rates of 11 Mbps.

In HSUPA, the Node B 302 allows several user equipment (UE) 301*a-e* devices to transmit at a certain power level at the same time. These grants are assigned to users by using a fast scheduling algorithm that allocates the resources on a short-term basis (on the order of tens of milliseconds (ms)). The rapid scheduling of HSUPA is well suited to the bursty nature of packet data. During periods of high activity, a user may get a larger percentage of the available resources, while getting little or no bandwidth during periods of low activity.

Figure 4:
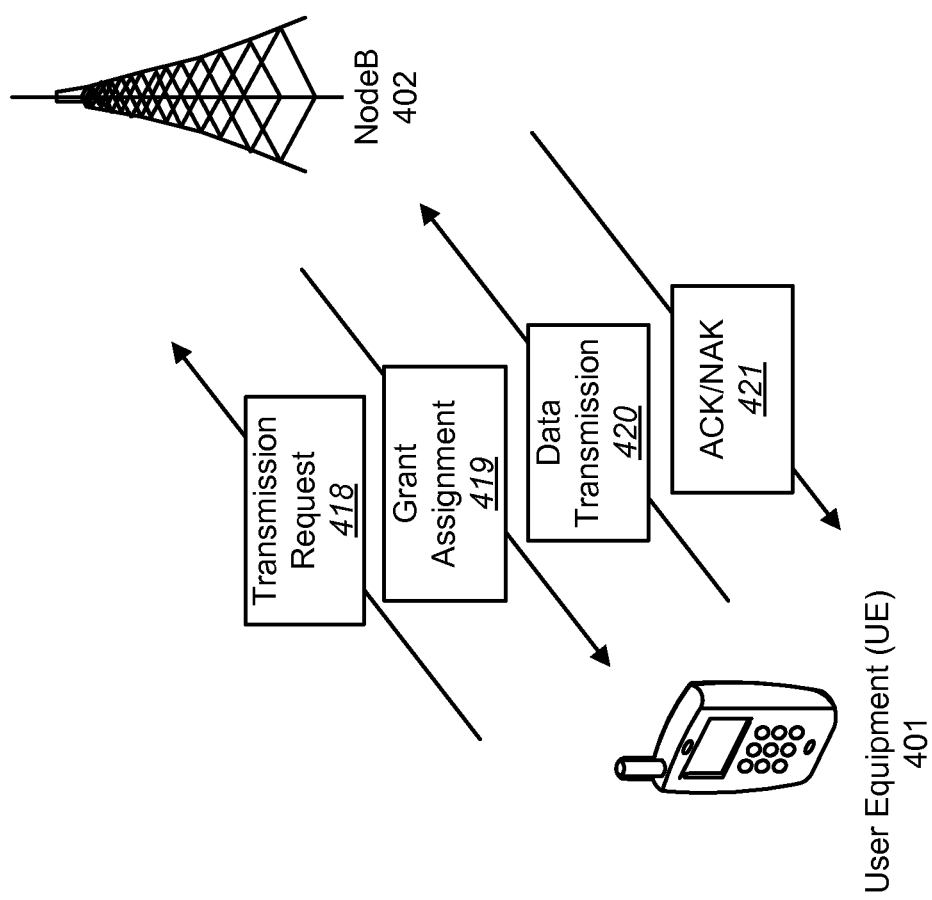
FIG. 4 is a block diagram illustrating high speed uplink packet access (HSUPA) operation between a user equipment (UE) and a Node B for scheduled data transmission.

FIG. 4 is a block diagram illustrating high speed uplink packet access (HSUPA) operation between a user equipment (UE) 401 and a Node B 402 for scheduled data transmission. The user equipment (UE) 401 may send a transmission request 418 for resources to the Node B 402. The Node B 402 may respond by sending a Grant Assignment 419 to the user equipment (UE) 401 that allocates some of the uplink band. The user equipment (UE) 401 may then use the grant to select an appropriate transport for a data transmission 420 to the Node B 402. If the user equipment (UE) 401 is in soft-handover, the data may be received by all the Node Bs 402 in the UE's 401 Active Set. The Node B 402 may attempt to decode the received data and send an ACK/NAK 421 to the user equipment (UE) 401. In the case of a NAK, the data may be retransmitted.

Figure 5:
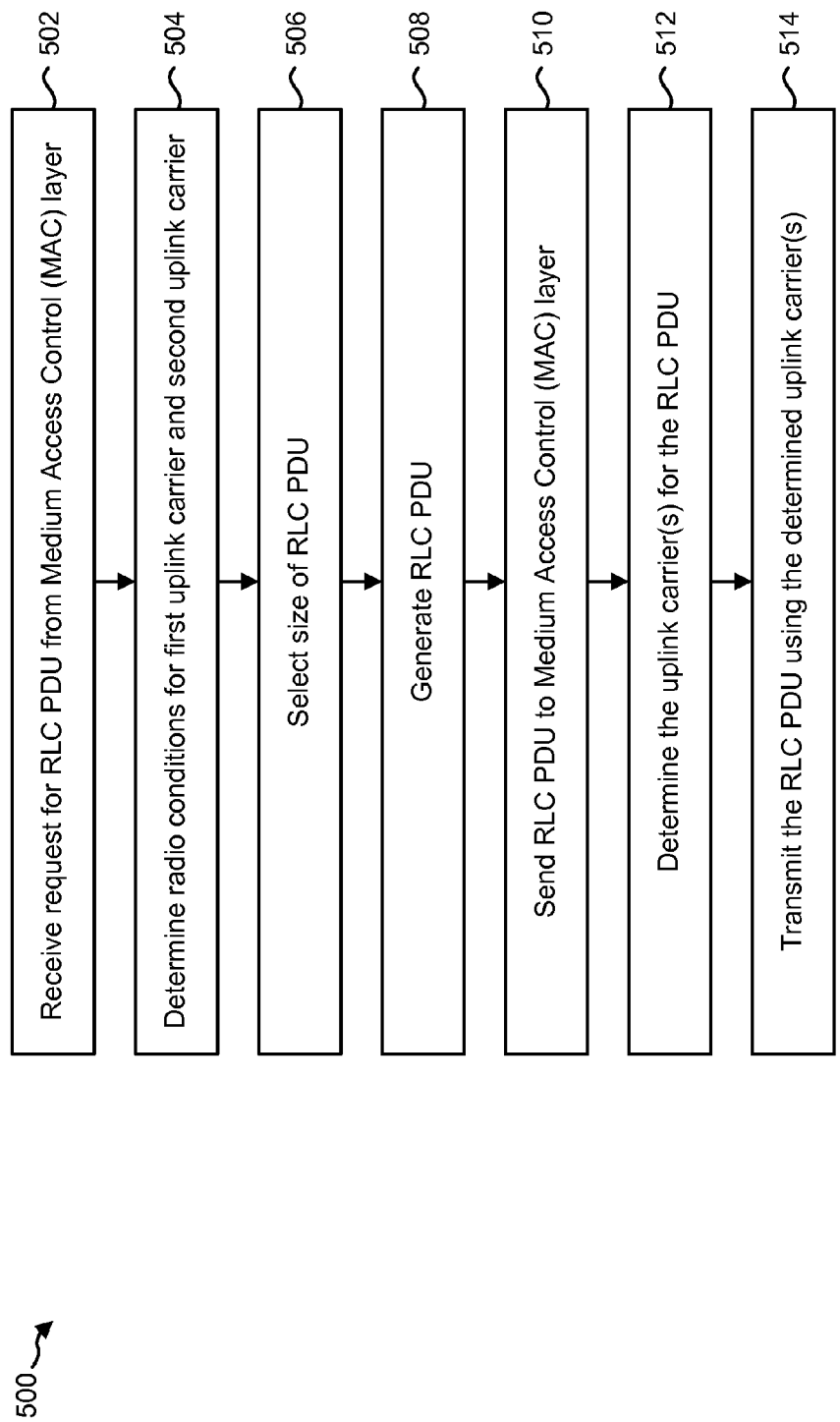
FIG. 5 is a flow diagram of a method for selecting the size of a radio link control (RLC) protocol data unit (PDU)

FIG. 5 is a flow diagram of a method 500 for selecting the size of a radio link control (RLC) protocol data unit (PDU). The method 500 may be performed by a wireless communication device 101. In one configuration, the method may be performed by a radio link control (RLC) layer 199 as part of a wireless communication device 101. The wireless communication device 101 may be a user equipment (UE) 201. The radio link control (RLC) layer 199 may receive 502 a request for an RLC PDU from the medium access control (MAC) layer 103 of the wireless communication device 101. The radio link control (RLC) layer 199 may then determine 504 radio conditions for a first uplink carrier 105*a* and a second uplink carrier 105*b*. In one configuration, more than two uplink carriers 105 may be used. As discussed above, the radio conditions for the first uplink carrier 105*a* may vary considerably from the radio conditions for the second uplink carrier 105*b*.

The radio link control (RLC) layer 199 may then select 506 a size of an RLC PDU based on the determined radio conditions. Because the RLC PDU could be transmitted on either of the carriers at a later TTI, the size of the RLC PDU should consider the variables of both the first uplink carrier 105*a* and the second uplink carrier 105*b* to avoid excessive segmentation of RLC PDUs or under-utilization of the carriers. In 3GPP Release 8, the RLC PDU size may be selected on the uplink (i.e., high speed uplink packet access (HSUPA)) in two ways when the "Flexible RLC PDU size" and the MAC-i/is are configured. The MAC-i/is is a MAC control entity. The MAC-i/is is discussed in additional detail below in relation to FIG. 11. The method for selecting the size of the RLC PDU depends on whether a user equipment (UE) 201 is capable of forming an RLC PDU to be transmitted at a given transmission time interval (TTI) with the enhanced transport format combination (E-TFC) selection. Selecting the size of an RLC PDU is discussed in further detail below in relation to FIG. 7.

The radio link control (RLC) layer 199 may then generate 508 the RLC PDU. The radio link control (RLC) layer 199 may send 510 the generated RLC PDU to the medium access control (MAC) layer 103. A user equipment (UE) 201 may determine 512 the uplink carrier(s) 105 for the generated RLC PDU. For example, the user equipment (UE) 201 may determine that the generated RLC PDU is to be transmitted using the first uplink carrier 105*a*. The user equipment (UE) 201 may then transmit 514 the RLC PDU using the determined uplink carrier(s) 105.

Figure 6:
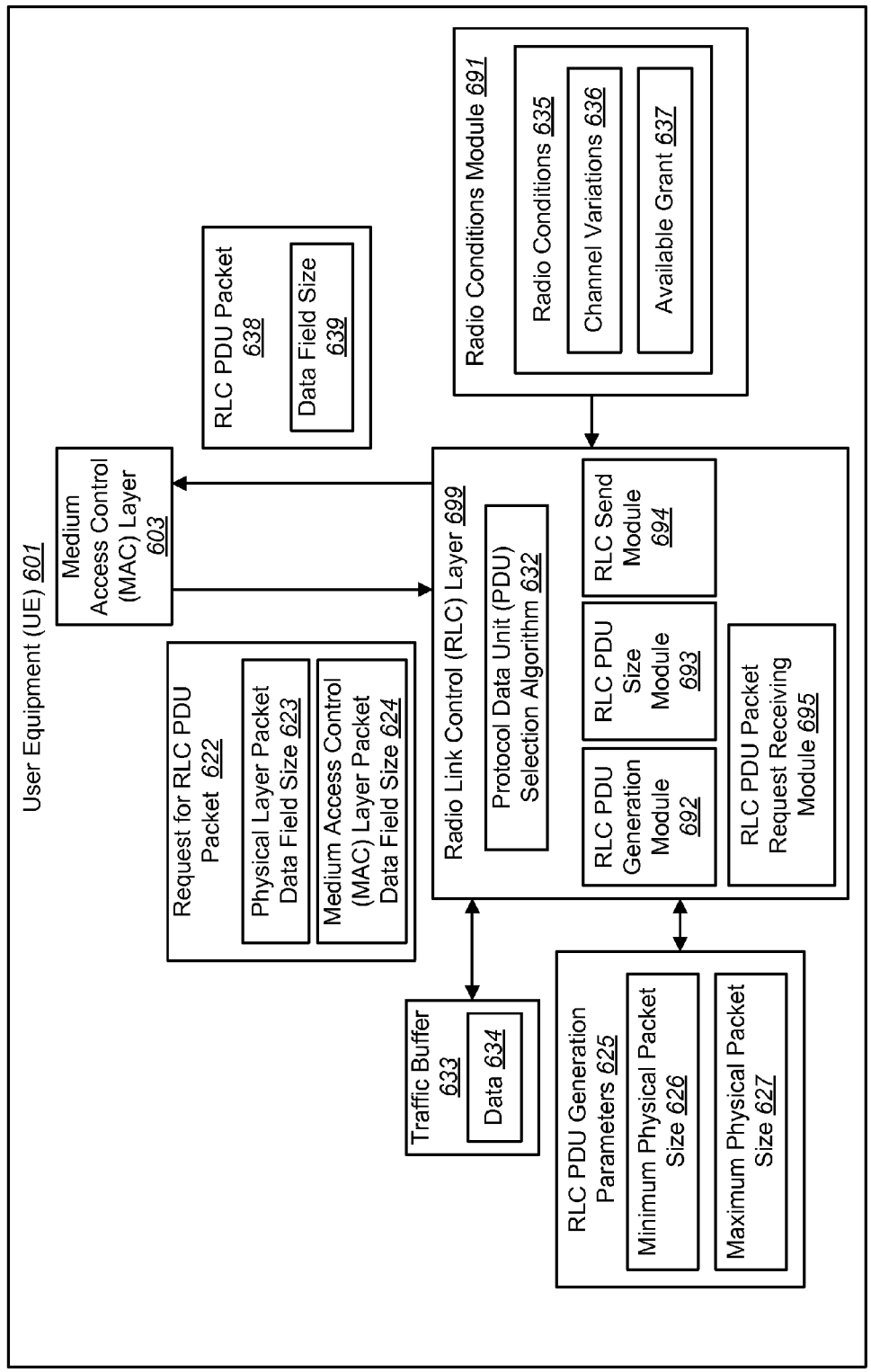
FIG. 6 is a block diagram illustrating data flows on a user equipment (UE) for the generation of a radio link control (RLC) protocol data unit (PDU) packet.

FIG. 6 is a block diagram illustrating data flows on a user equipment (UE) 601 for the generation of a radio link control (RLC) protocol data unit (PDU) packet 638. The user equipment (UE) 601 of FIG. 6 may be one configuration of the wireless communication device 101 of FIG. 1. The user equipment (UE) 601 may include a radio link control (RLC) layer 699. The user equipment (UE) 601 may also include a medium access control (MAC) layer 603. The radio link control (RLC) layer 699 may generate an RLC PDU packet 638 using an RLC PDU generation module 692. The radio link control (RLC) layer 699 may use a protocol data unit (PDU) selection algorithm 632 when generating an RLC PDU packet 638. The wireless communications network 100 may direct the user equipment (UE) 601 to have a residual error less than a residual error threshold. Residual error is the error after all the transmission attempts. The physical layer 104 usually operates at a fixed residual error target such as 1%, which is achieved by power control. There may be no error target threshold signaled by the network 100 at the radio link control (RLC) layer 699 for RLC PDU packets 638. The residual error threshold may then be a desired target. For example, the residual error threshold may guarantee that RLC errors and re-transmissions are minimized and transmission control protocol (TCP) performance does not degrade. As a result, the protocol data unit (PDU) selection algorithm 632 may operate to have a residual error less than a residual error threshold.

The RLC PDU packet 638 may be generated to have a specific data field size 639. The data field size 639 of an RLC PDU packet 638 may correspond to the amount of data in the RLC PDU packet 638. The radio link control (RLC) layer 699 may use an RLC PDU size module 693 to determine the size of the RLC PDU packet 638. The RLC PDU packet 638 may then be sent to the medium access control (MAC) layer 603. The radio link control (RLC) layer 699 may use an RLC send module 694 to send the RLC PDU packet 638 to the medium access control (MAC) layer 603.

The radio link control (RLC) layer 699 may generate an RLC PDU packet 638 in response to a request 622 for an RLC PDU packet received from the medium access control (MAC) layer 603. The radio link control (RLC) layer 699 may receive a request 622 for an RLC PDU packet using an RLC PDU packet request receiving module 695. A request 622 for an RLC PDU packet may include a physical layer packet data field size 623. The physical layer packet data field size 623 may indicate the amount of data needed to fill a current physical layer packet. The request 622 for an RLC PDU packet may also include a medium access control (MAC) layer packet data field size 624. The medium access control (MAC) layer packet data field size 624 may indicate the amount of data needed to fill a current MAC layer packet.

The radio link control (RLC) layer 699 may also generate an RLC PDU packet 638 in anticipation of receiving a request 622 for an RLC PDU packet from the medium access control (MAC) layer 603. For example, the radio link control (RLC) layer 699 may receive a request 622 for one or more RLC PDU packets from the medium access control (MAC) layer 603 for each transmission time interval (TTI). The radio link control (RLC) layer 699 may generate an RLC PDU packet 638 for a later TTI to increase efficiency.

The radio link control (RLC) layer 699 may generate the RLC PDU packet 638 using data 634 within a traffic buffer 633. The data 634 within the traffic buffer 633 may be the data used in the data field of the RLC PDU packet 638. The data field size 639 of the RLC PDU packet 638 may correlate with the amount of data 634 available in the traffic buffer 633.

The radio link control (RLC) layer 699 may receive data 634 from logical flows. The data 634 from logical flows may come from a packet data convergence protocol (PDCP) layer or a radio resource control (RRC) layer. For example, if there is no header compression, RLC service data units (SDUs) may be transmission control protocol/internet protocol (TCP/IP) packets.

The radio link control (RLC) layer 699 may select the size 639 of the RLC PDU packet 638 based on RLC PDU generation parameters 625. The radio link control (RLC) layer 699 may also select the size 639 of the RLC PDU packet 638 based on radio conditions 635. The radio conditions 635 may include channel variations 636 and the available serving or non-serving grants 637. Channel variations 635 may be detected by the user equipment (UE) 601 or received from a base station 102 via the downlink 106. Channel variations 636 may include the first uplink carrier 105a transmit power, the second uplink carrier 105b transmit power, the first uplink carrier 105a pilot power, the second uplink carrier 105b pilot power, the available power in addition to the current uplink pilot power, etc. Radio conditions may be received/determined by a radio conditions module 691.

The available grant 637 may be received from a base station 102 on the downlink 106 via serving and non-serving grants. The available grant 637 may restrict the size of the physical layer packet. The serving grant at the user equipment (UE) 601 may be updated based on grants received from base stations 102 in the active set (in HSPA). In Long Term Evolution (LTE) radio technologies, there may not be an active set. LTE radio technologies may use other signaling that can prompt the user equipment (UE) 601 to update its serving grant. The serving grant determines how much power the user equipment (UE) 601 can use on the first uplink carrier 105a and the second uplink carrier 105b. The serving grant also determines the frequency allocated for the first uplink carrier 105a and the frequency allocated for the second uplink carrier 105b. Channel variations 636 may also cause a change in the available power.

The RLC PDU generation parameters 625 may include a minimum physical packet size 626 from among the preceding N time units. The RLC PDU generation parameters 625 may also include a maximum physical packet size 627 from among the preceding N time units. The minimum and maximum physical packet sizes 626, 627 from the preceding N time units may be determined by the user equipment (UE) 601. For example, the user equipment (UE) 601 may store the size for each physical layer packet generated.

Figure 7:
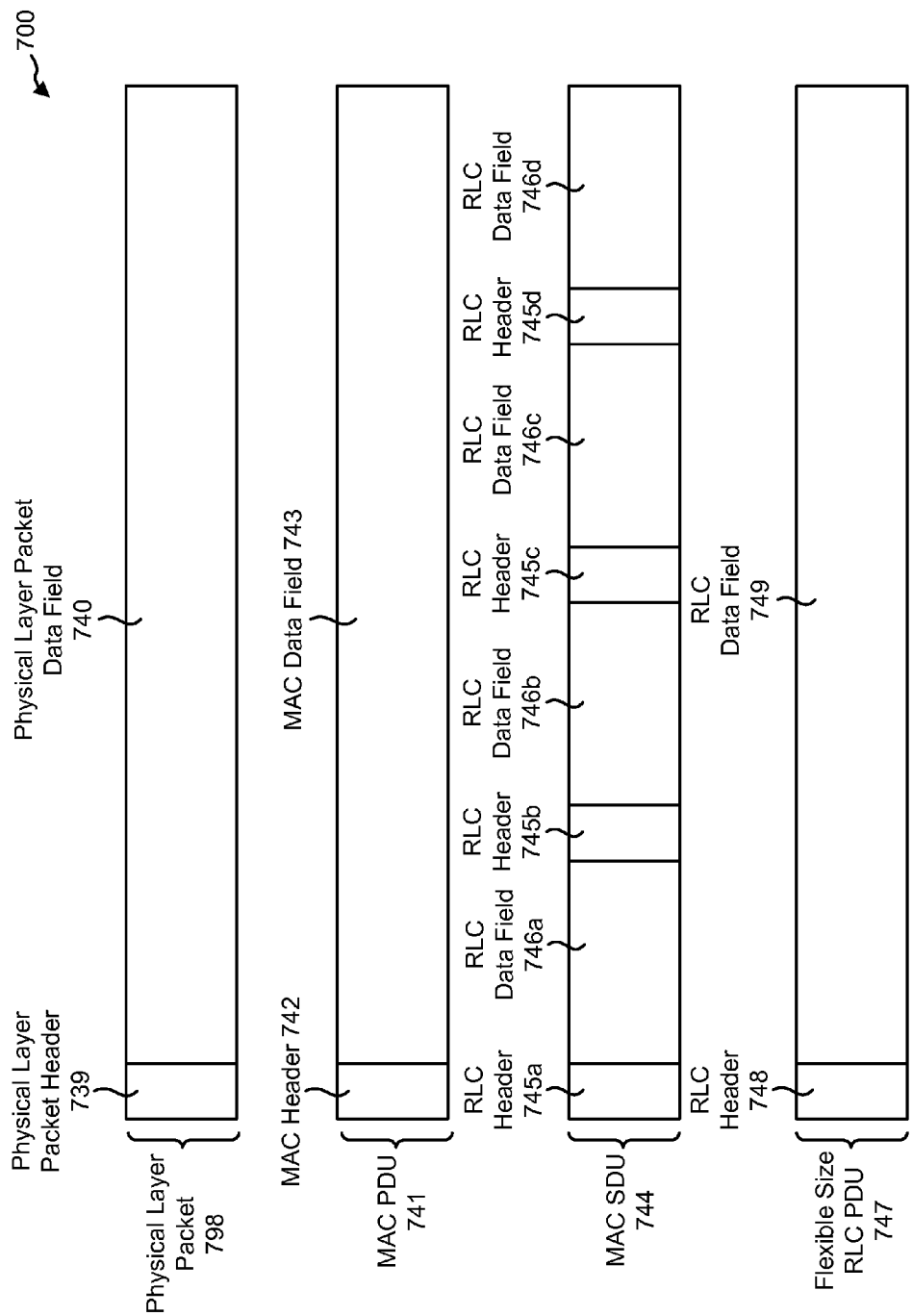
FIG. 7 illustrates a physical layer packet, a MAC PDU, an RLC PDU and a flexible size RLC PDU for use in the present systems and methods.

FIG. 7 illustrates a physical layer packet 798, a MAC PDU 741, a MAC PDU 744 and a flexible size RLC PDU 747 for use in the present systems and methods. The physical layer packet 798 may be generated by the physical layer 104 of a wireless communication device 101. The physical layer packet 798 may include a physical layer packet header 739, a physical layer packet data field 740 and a cyclic redundancy check (CRC). The physical layer packet data field 740 may specify the amount of data that can be sent in the physical layer packet 798. When there is data available to be transmitted in the upper layer buffers, the medium access control (MAC) layer 103 may generate a MAC PDU 741. The medium access control (MAC) layer 103 may only need to know how many bits are available to be sent in the physical layer 104. Then, after the MAC PDU 741 is formed, the MAC PDU 741 may be passed to the physical layer 104. The MAC PDU 741 may include a MAC header 742 and a MAC data field 743. The size of the MAC data field 743 may correspond to the size of the physical layer packet data field 740.

As part of an enhanced transport format combination (E-TFC) selection, the medium access control (MAC) layer 103 may request a radio link control (RLC) layer 199 to provide MAC SDUs 744 to fill the MAC PDU 741. The request may instruct the radio link control (RLC) layer 199 to prepare a MAC SDU 744 that will fill the bits available in the MAC packet. In general, the MAC SDU 744 size does not have to exactly match the available MAC bits since the radio link control (RLC) layer 199 can use the previous TTI values. The radio link control (RLC) layer 199 may generate a MAC SDU 744 to fill the MAC data field 743. A MAC SDU 744 may include multiple RLC data fields 746a-d if the size of the MAC data field 743 is larger than the size of each RLC data field 746. If the size of the MAC data field 743 is smaller than the size of each RLC data field 746, the RLC data field 746 may be broken into pieces and each piece may be used to fill a MAC data field 743. Each RLC data field 746 may include a corresponding RLC header 745a-d.

The radio link control (RLC) layer 199 may generate a flexible size RLC PDU 747 with a flexible size RLC data field 749 which means that the RLC PDU size is not fixed at all times and may vary according to network configuration and dynamic radio conditions. The flexible size RLC PDU 747 may include only a single RLC header 748 and a single RLC data field 749. The decreased number of RLC headers 748 may increase the efficiency of a wireless communication device 101.

Figure 8:
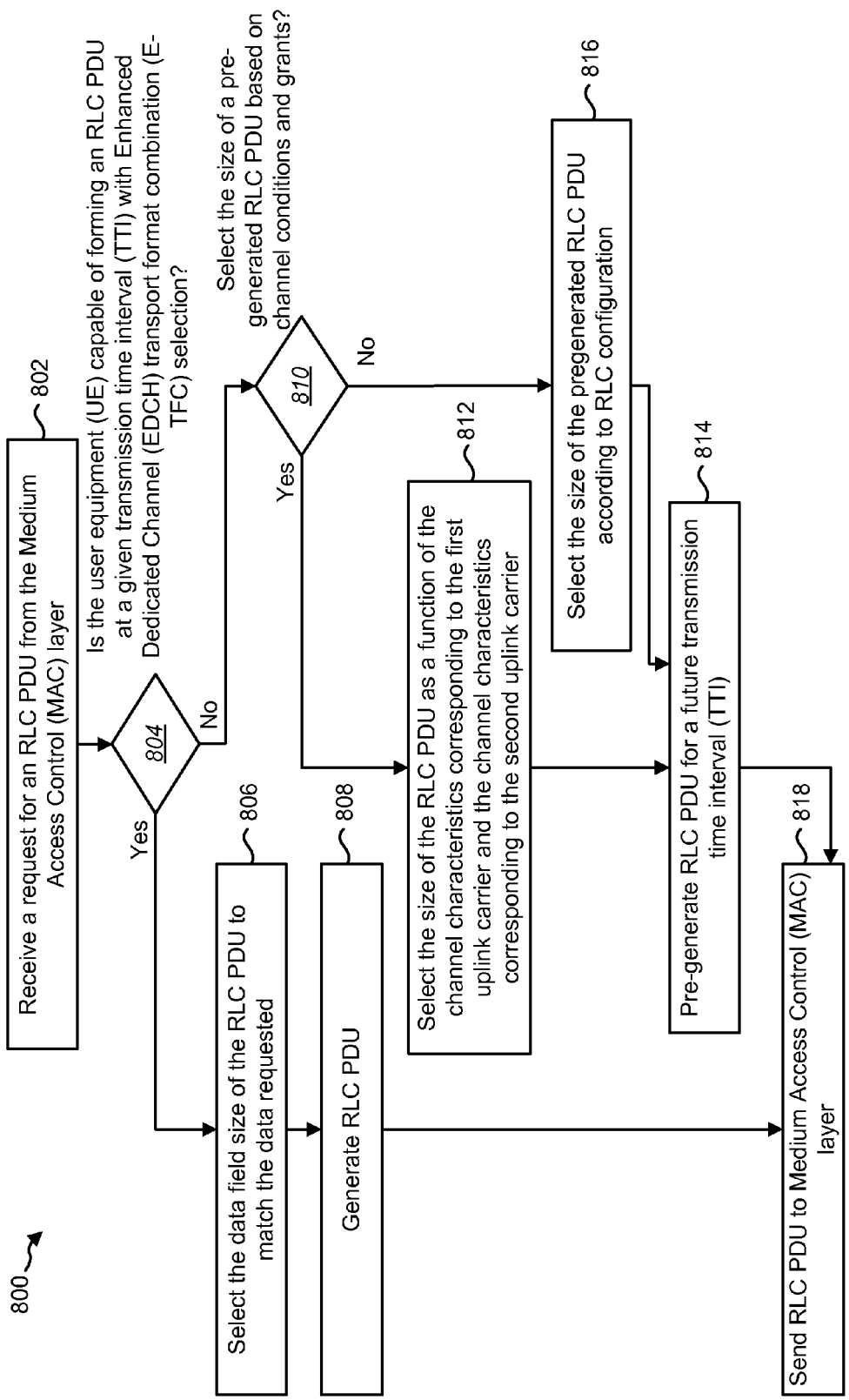
FIG. 8 is a flow diagram of a method for generating an RLC PDU.

FIG. 8 is a flow diagram of a method 800 for generating an RLC PDU 638. The method 800 may be performed by a radio link control (RLC) layer 699 as part of a user equipment (UE) 601. The radio link control (RLC) layer 699 may receive 802 a request 622 for an RLC PDU from a medium access control (MAC) layer 603. The radio link control (RLC) layer 699 may then determine 804 whether the user equipment (UE) 601 is capable of forming an RLC PDU 638 at a given TTI with enhanced dedicated channels (EDCH) Transport Format Combination (T-TFC) selection. If the user equipment (UE) 601 is capable of forming an RLC PDU 638 at a given TTI with EDCH Transport Format Combination (E-TFC) selection, the radio link control (RLC) layer 699 may select 806 a data field size 639 of the RLC PDU 638 to match the data requested. The radio link control (RLC) layer 699 may then generate 808 the RLC PDU 638. Forming an RLC PDU 638 at a given TTI with EDCH Transport Format Combination (E-TFC) selection may be referred to as a fully radio aware scheme. Fully radio aware schemes are discussed in further detail below in relation to FIG. 9. Once the radio link control (RLC) layer 699 has generated an RLC PDU 638, the radio link control (RLC) layer 699 may send 818 the RLC PDU 638 to the medium access control (MAC) layer 603.

If the user equipment (UE) is not capable of forming an RLC PDU 638 at a given TTI with EDCH Transport Format Combination (E-TFC) selection, then the radio link control (RLC) layer 699 may pre-generate an RLC PDU 638 to be transmitted in a later TTI. In this case, if there is only a single carrier configured for the uplink, the size 639 of the RLC PDU 638 matches the maximum amount of data allowed to be transmitted by the applicable current grant 637 (scheduled or non-scheduled) for the current TTI. To prevent excessive MAC segmentation, the amount of data in outstanding pre-generated RLC PDUs 638 for the logical channel may be less than or equal to four times the maximum amount of data allowed to be transmitted by the applicable current grant 637 (scheduled or non-scheduled) for the current TTI. This is specified in 3GPP 25.322-830. The amount of data in outstanding pre-generated RLC PDUs 638 for the logical channel may be less than or equal to a number other than four times the maximum amount of data allowed.

The radio link control (RLC) layer 699 may determine 810 whether to select the size of the pre-generated RLC PDU 638 based on channel conditions and grants. If it is determined that the user equipment (UE) 601 will select the size of the pre-generated RLC PDU 638 based on channel conditions and grants, the radio link control (RLC) layer 699 may select 812 the size of the RLC PDU 638 as a function of the channel characteristics corresponding to the first uplink carrier 105a and the channel characteristics corresponding to the second uplink carrier 105b.

For example, a solution could be defined such that the size of the RLC PDU 638 used at time t is the form of PDU_size(t)=f(X1(t), X2(t)), where X1(t) and X2(t) are vectors such that $X1(t)=\{x1(k)|t-T<k\leq t\}$ and $X2(t)=\{x2(k)|t-T<k\leq t\}$, where x1(k) is the packet size corresponding to the serving grant for the first uplink carrier 105a and x2(k) is the packet size corresponding to the serving grant for the second uplink carrier 105b at time k after adjusting for the necessary packet headers. x1(k) and x2(k) may be determined by the current channel conditions and grants received from the network. The channel conditions may include the UE's 601 power headroom, which is defined as the UE's 601 total transmit power after subtracting the transmit powers for overhead channels from the maximum transmit power. Since the size of the RLC PDU 638 may be chosen as a larger value when the serving grants are high, it may be assumed that f is a monotonic increasing function in both variables. For practical implementations, it may be preferable to choose T=0 so that only the current serving grants are used in the decision process. In order to keep the current solution similar to the single carrier solution already adopted, a linear function may be used for f. Some alternatives for the T=0 case include K*max(x1(t), x2(t)), K*min(x1(t), x2(t)) or K*((x1(t)+x2(t)/2) where K>0 is a constant. For T>0, the minimum and maximum may be used similarly where $\min X(t)=\min\{x(k)|t-T<k\leq t\}$. Once the size of the RLC PDU 638 has been selected, the radio link control (RLC) layer 699 may pre-generate 814 the RLC PDU 638 for a future TTI. After the radio link control (RLC) layer 699 has generated an RLC PDU 638, the radio link control (RLC) layer 699 may send 818 the RLC PDU 638 to the medium access control (MAC) layer 603.

If it is determined that the user equipment (UE) 601 will not select the size of the pre-generated RLC PDU 638 based on channel conditions and grants, the radio link control (RLC) layer 699 may select 816 the size of the pre-generated RLC PDU 601 according to RLC configuration. It may be assumed that the current grants will be the same when the RLC PDU 638 is transmitted. In this case, different weights can be used for segmentation and under-utilization in defining a function f to be minimized. For example, if the current serving grants are 1,000 bits for the first uplink carrier 105a and 500 bits for the second uplink carrier 105b, the number of segments may be minimized, ignoring the header bits, by taking the RLC PDU 638 size to be 500 bits. The radio link control (RLC) layer 699 may then pre-generate 814 the RLC PDU 638 for a future TTI. After the radio link control (RLC) layer 699 has generated an RLC PDU 638, the radio link control (RLC) layer 699 may send 818 the RLC PDU 638 to the medium access control (MAC) layer 603.

In one configuration, the RLC PDU 638 size determination may be further optimized. For example, if the user equipment (UE) 601 can pick the RLC PDUs 638 at transmission time based on their sizes during E-TFC selection, then the user equipment (UE) 601 can alternate the RLC PDU 638 size between the grants on each uplink carrier 105 equally. This choice may be optimal, assuming that the serving grants do not change until transmission time and hybrid automatic repeat request (HARD) statistics are equal for different packet sizes.

If it is known at the current time which uplink carrier 105 the pre-generated RLC PDU 638 will be transmitted on later, the same selection mechanism used for a single carrier may be employed for dual carriers. A fixed mapping between the traffic flows (logical channel) and the carriers may be used so that packets from a certain flow are carried only on a certain carrier. The upper bound on the amount of data in outstanding pre-generated RLC PDUs 638 may still be imposed. An upper bound similar to the one used for the single carrier can be applied here, where the serving grant used at the generation time for single carrier is replaced with the above function fin the dual carriers. The upper bound may be made more generic even though a constant number (such as "four" in single carrier case) could be preferable for practical implementations (i.e., the examples above (such as the solutions of the form PDU_size(t)=f(X1(t), X2(t))) may be used for the upper bound where K is chosen as the appropriate constant.

Figure 9:
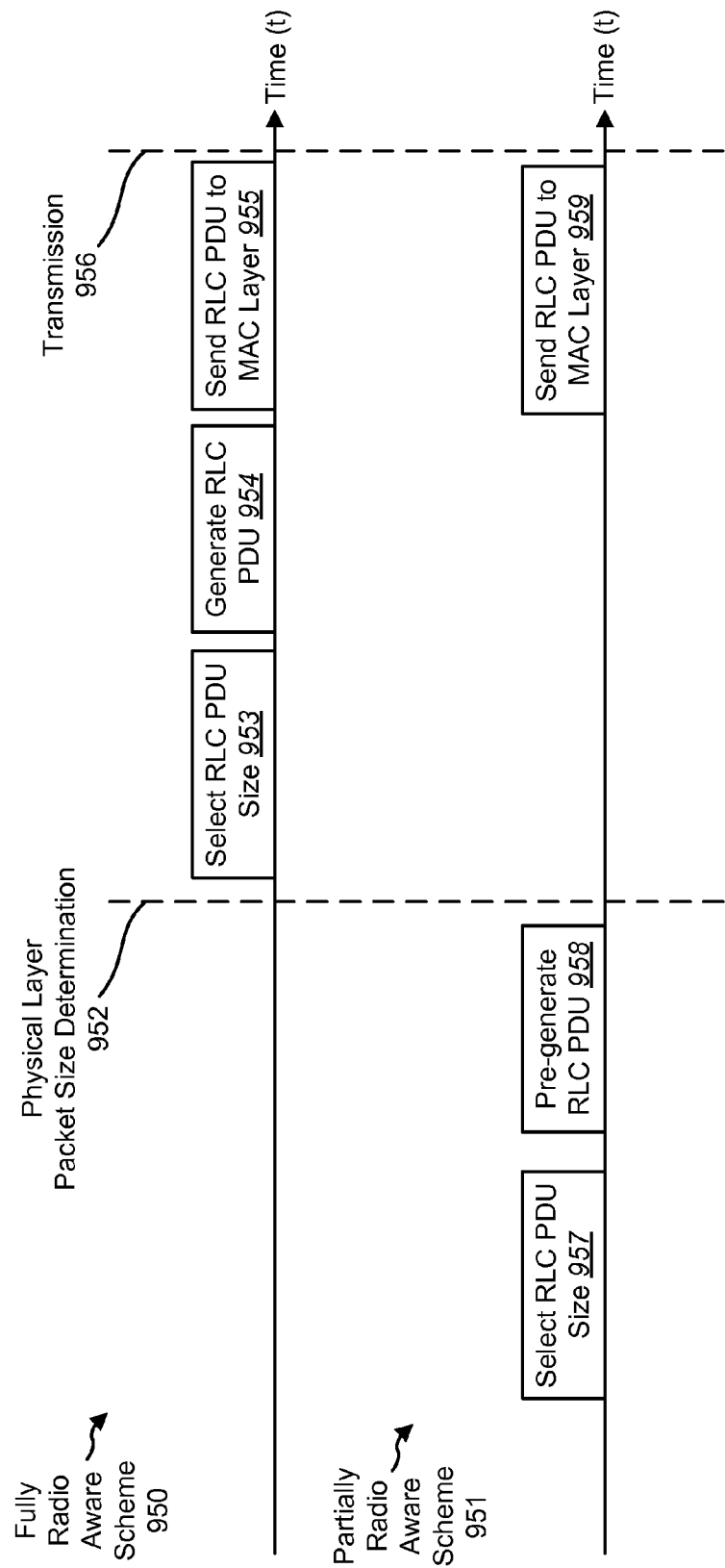
FIG. 9 illustrates and compares the timing structures of a fully radio aware scheme and a partially radio aware scheme as part of generating an RLC PDU.

FIG. 9 illustrates and compares the timing structures of a fully radio aware scheme 950 and a partially radio aware scheme 951 as part of generating an RLC PDU 638. In the fully radio aware scheme 950, the radio link control (RLC) layer 699 may determine 952 the physical layer packet size. The radio link control (RLC) layer 699 may then select 953 an RLC PDU 638 size corresponding to the determined physical layer packet size. In one configuration, the RLC PDU 638 size may be selected such that exactly one RLC PDU 638 is generated to fit in one MAC PDU 741 (minus the size of necessary headers and assuming the traffic buffer 633 has enough data 634). The benefit of such a scheme is that the RLC PDU 638 is not segmented at the medium access control (MAC) layer 103.

The RLC residual error for the first transmission may be the same as the physical layer error if the RLC PDU 638 is sent in one physical layer. If the RLC PDU 638 is segmented into several physical packets, when the decoding of any of these physical packets fails, the whole RLC PDU 638 decoding fails. For example, if the physical residual error is 0.01 and there are two segments per RLC PDU 638, then the RLC residual error is $1-(1-0.01)^2 \approx 0.02$. In addition, the header overhead is minimal without segmentation since each segment has its own header. The radio link control (RLC) layer 699 may then generate 954 the RLC PDU 638 and send 955 the RLC PDU 638 to the medium access control (MAC) layer 103 prior to transmission 956 of the physical layer packet by the physical layer 104. Additional delays may be necessary to process grants and prepare the packet but these may be assumed to be constant for different user equipments (UEs) 601.

Some user equipments (UEs) 601 may be unable to select 953 an RLC PDU 638 size, generate 954 an RLC PDU 638 and send 955 the RLC PDU 638 to the medium access control (MAC) layer 103 fast enough after determining 952 the physical layer packet 798 size for transmission 956. Thus, in a partially radio aware scheme 951, the radio link control (RLC) layer 699 may select 957 an RLC PDU 638 size prior to the physical layer packet 798 size determination 952. The radio link control (RLC) layer 699 may also pre-generate 958 the RLC PDU 638 prior to the physical layer packet 798 size determination 952. This may ensure that the radio link control (RLC) layer 699 is able to send 959 the RLC PDU 638 to the medium access control (MAC) layer 103 prior to the deadline for transmission 956. Alternatively, the radio link control (RLC) layer 699 may pre-generate 958 the RLC PDU 638 after the physical layer packet 798 size determination 952.

In the partially radio aware scheme 951, it may still be necessary that there is a close relationship between the size of the RLC PDU 638 and the size of the physical layer packet 798 in order to have lower residual error and a lower header overhead. When more RLC PDUs 638 are multiplexed, each RLC PDU 638 will have its own header in the MAC PDU 741. Thus, in the partially radio aware scheme 951, the RLC PDU 638 size still depends on the radio conditions 635 but is not chosen at the exact time when the physical layer packet 798 size is determined 952.

Figure 10:
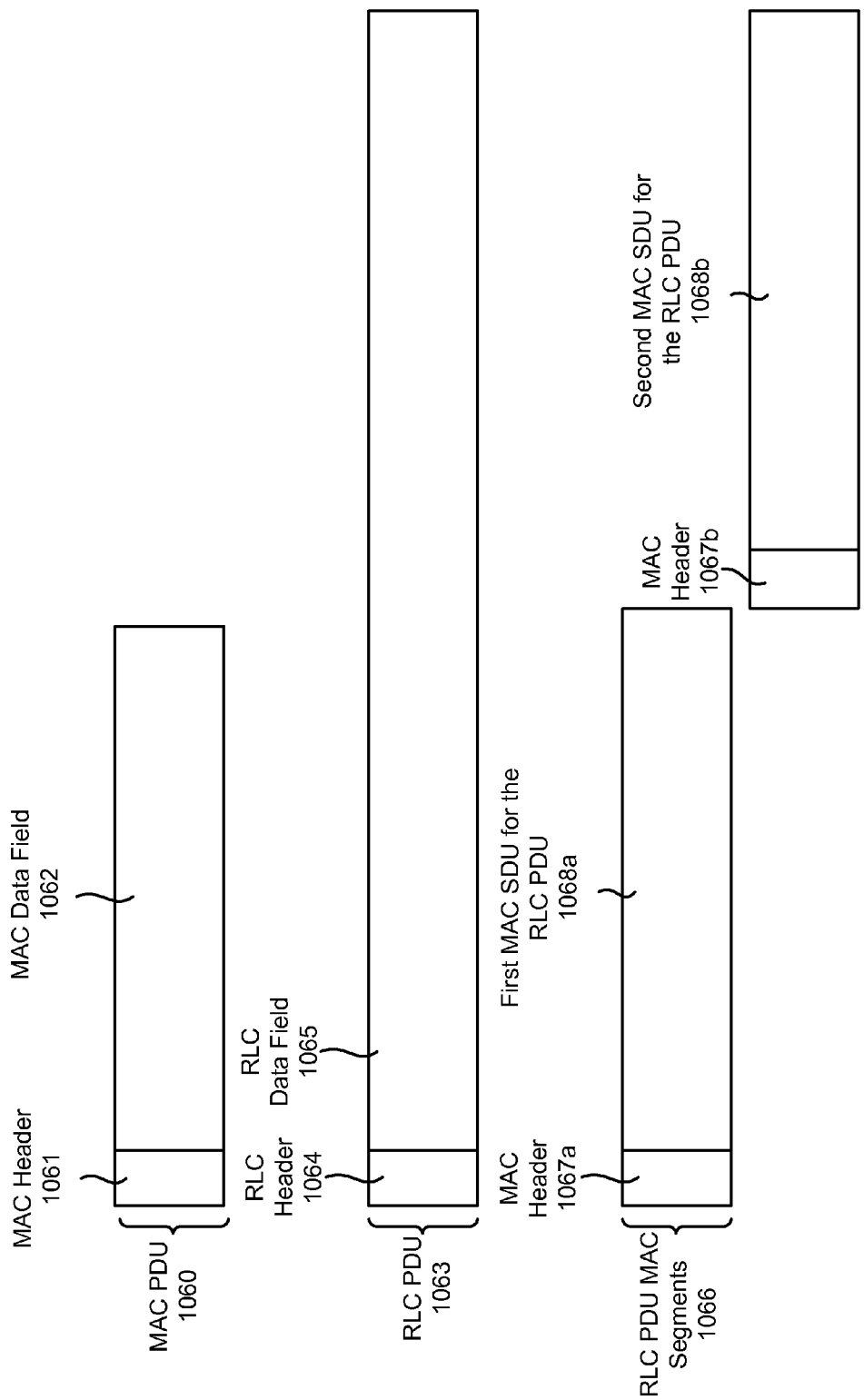
FIG. 10 illustrates MAC SDUs of RLC PDU MAC segments for use in the present systems and methods.

FIG. 10 illustrates MAC SDUs 1068 of RLC PDU MAC segments 1066 for use in the present systems and methods. A MAC PDU 1060 including a MAC header 1061 and a MAC data field 1062 may be received by a radio link control (RLC) layer 199. In a partially radio aware scheme 951, the radio link control (RLC) layer 199 may have previously generated an RLC PDU 1063 having an RLC header 1064 and an RLC data field 1065. However, the RLC data field 1065 may be much larger than the MAC data field 1062. The radio control link (RLC) layer 199 may separate the RLC data field 1065 into a first MAC SDU 1068a for the RLC PDU 1063 and a second MAC SDU 1068b for the RLC PDU 1063 as part of RLC PDU MAC segments 1066. Each MAC SDU 1068 for the RLC PDU may include a MAC header 1067a, 1067b.

The network 100 may place restrictions on the number of MAC SDUs 1068 of an RLC PDU 1063 to ensure that the residual error is less than a residual error threshold. Assuming that the physical layer errors are independent and identically distributed, the physical layer errors may be calculated using $1-(1-p)^n$, where n is the number of MAC SDUs 1068 of an RLC PDU 1063 and p is the probability that a physical transmission fails. The network 100 may set a condition for the wireless communication device 101 that the value of n or the filtered output of n be less than a MAC segment maximum threshold.

Figure 11:
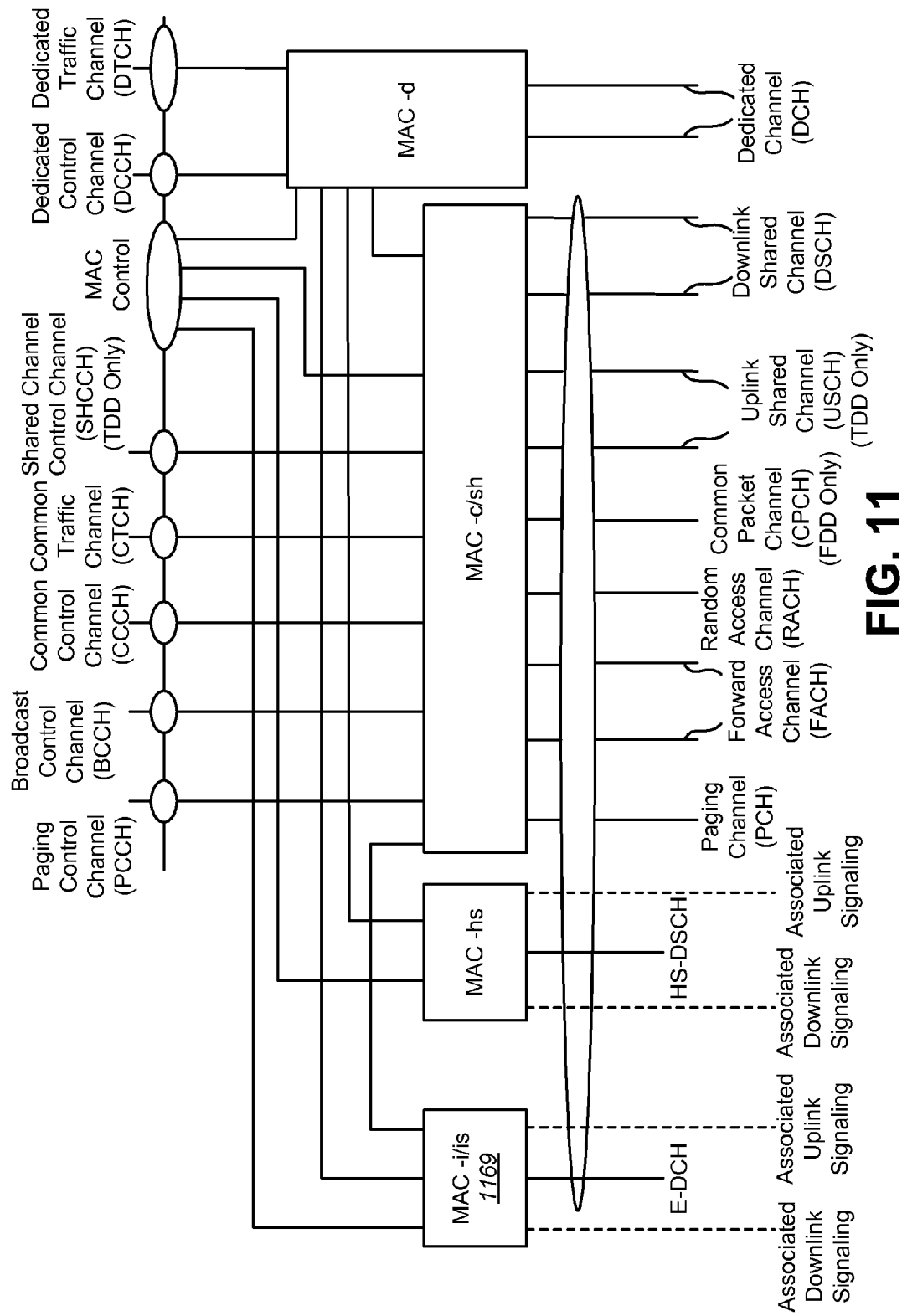
FIG. 11 illustrates the MAC architecture for a MAC entity MAC-i/MAC-is (MAC-i/is)

FIG. 11 illustrates the MAC architecture for a MAC entity MAC-i/MAC-is (MAC-i/is) 1169. MAC-i/is 1169 is a new MAC entity introduced in 3GPP Release 8. MAC-i/is 1169 may be used alternatively to MAC-es/e. Higher layers may configure which entity handles the data transmitted on the enhanced dedicated channels (E-DCH) and the management of physical resources allocated to E-DCH. An E-DCH Transport Format Combination (E-TFC) is a MAC-es/e or MAC-i/is entity. The detailed configuration of E-DCH may be provided by the radio resource control (RRC) over the MAC-Control Service Access Point (SAP). Enhanced dedicated channels (E-DCHs) are high data rate uplink channels introduced in Release 6 of UMTS. An E-DCH may include an enhanced control part (e.g., an E-DCH dedicated physical control channel (E-DPCCH)) and an enhanced data part (e.g., an E-DCH dedicated physical control channel (E-DPDCH)) in accordance with UMTS protocols). Flexible RLC PDU sizes and segmentation/reassembly on the uplink are supported by MAC-i/is 1169. Specific details about the MAC entities (such as the MAC-hs, the MAC-c/sh and the MAC-d) may be obtained from 3GPP 25.321.

Control of the MAC entities may include associated downlink signaling, associated uplink signaling, an enhanced dedicated channel (E-DCH), high speed downlink shared channel (HS-DSCH), a paging control channel (PCCH), a broadcast control channel (BCCH), a common control channel (CCCH), a common traffic channel (CTCH), a shared control channel (SHCCH) (TDD only), a MAC control, a dedicated control channel (DCCH), a dedicated traffic channel (DTCH), a dedicated channel (DCH), a downlink shared channel (DSCH), an uplink shared channel (USCH) (TDD only), a common packet channel (CPCH) (FDD only), a random access channel (RACH), a forward access channel (FACH), a paging channel (PCH), and a high speed downlink shared channel (HS-DSCH).

Figure 12:
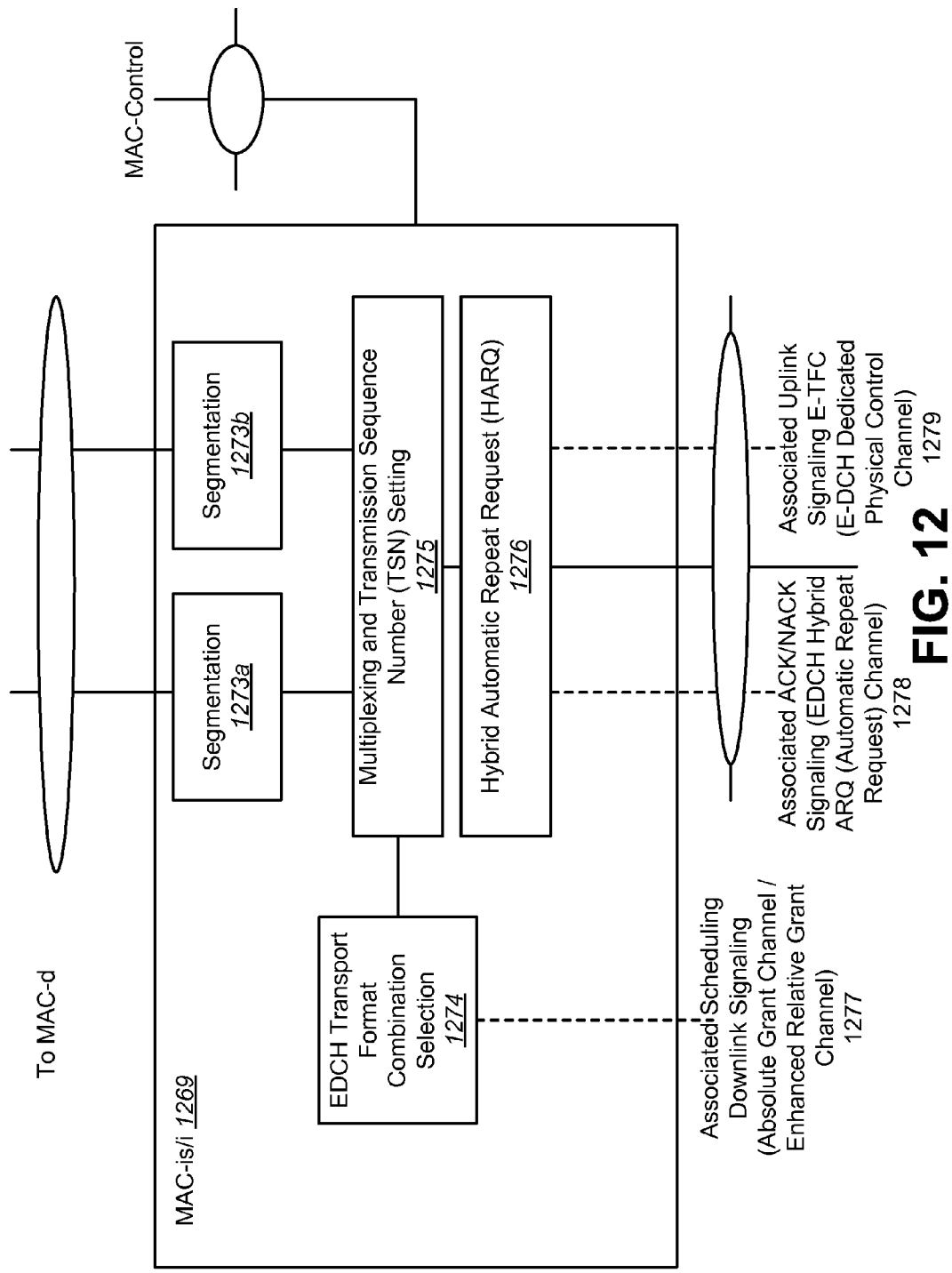
FIG. 12 is a more detailed illustration of the MAC-i/is on the user equipment (UE) side.

FIG. 12 is a more detailed illustration of the MAC-i/is 1269 on the user equipment (UE) 601 side. Reordering on the receiver side is based on priority queues. To enable reordering, transmission sequence numbers (TSN) are assigned within each reordering queue. On the receiver side, the MAC-i/is 1269 service data unit (SDU) or segment is assigned to the correct priority queue based on the logical channel identifier. MAC-i/is 1269 SDUs may be segmented and are reassembled on the receiver side. The MAC-i/is 1269 SDUs included in a MAC-i/is 1269 PDU may have different sizes and priorities. The MAC-i/is 1269 SDUs included in a MAC-i/is 1269 PUD may also belong to different MAC-d 1172 flows. The MAC-i/is 1269 protocol is configured in layers higher than the medium access control (MAC) layer 103. The MAC-is/i 1269 may include an EDCH Transport Format Combination Selection 1274, segmentation 1273a-b, a multiplexing and transmission sequence number (TSN) setting 1275 and a hybrid automatic repeat request (HARM) 1276. The MAC-is/i 1269 may also receive associated scheduling downlink signaling (absolute grant channel/enhanced relative grant channel) 1277. The MAC-is/i may also receive associated ACK/NACK signaling (EDCH hybrid ARQ (automatic repeat request) channel) 1278 and associated uplink signaling E-TFC (E-DCH dedicated physical control channel) 1279. Additional details may be found in the 3GPP 25.321 specification.

Figure 13:
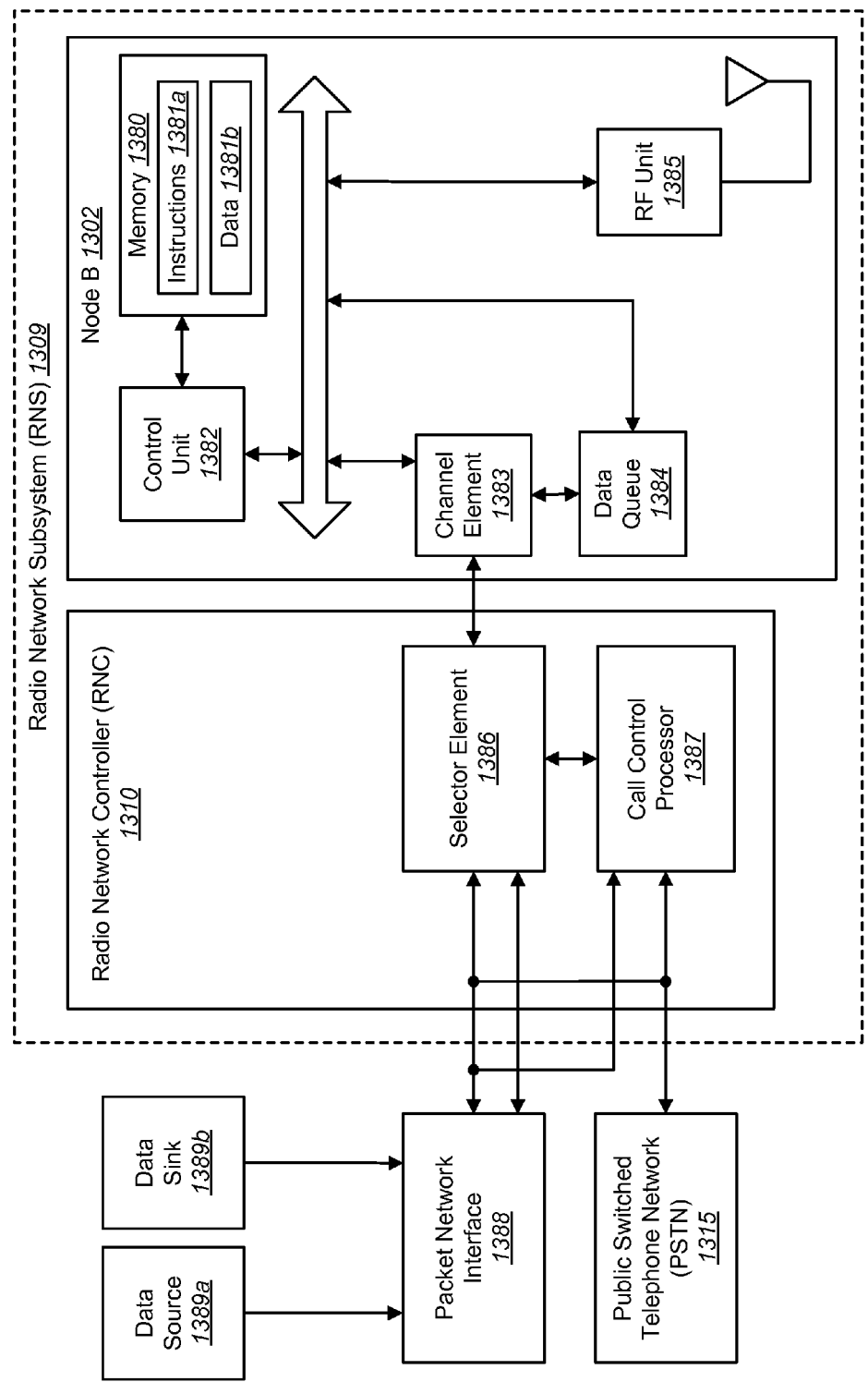
FIG. 13 illustrates a Node B and a radio network controller (RNC) in communication with a packet network interface.

FIG. 13 illustrates a Node B 1302 and a radio network controller (RNC) 1310 in communication with a packet network interface 1388. The Node B 1302 and radio network controller (RNC) 1310 may be part of a Radio Network Subsystem (RNS) 1309. The Radio Network Subsystem (RNS) 1309 of FIG. 13 may be one configuration of the Radio Network Subsystem (RNS) 209 illustrated in FIG. 2. The associated quantity of data to be transmitted is retrieved from a data queue 1384 in the Node B 1302 and provided to a channel element 1383 for transmission to the user equipment (UE) 201 associated with the data queue 1384.

The radio network controller (RNC) 1310 interfaces with a Public Switched Telephone Network (PSTN) 1315 through a mobile switching center. The radio network controller (RNC) 1310 also interfaces with one or more Node Bs 1302. The radio network controller (RNC) 1310 may further interface with a Packet Network Interface 1388. The radio network controller (RNC) 1310 coordinates the communication between user equipment in the communication system and other users connected to the packet network interface 1388 and the Public Switched Telephone Network (PSTN) 1315. The Public Switched Telephone Network (PSTN) 1315 may then interface with users through a standard telephone network.

The radio network controller (RNC) 1310 may include many selector elements 1386. Each selector element 1386 is assigned to control communication between one or more Node Bs 1302 and one remote station (not shown). If a selector element 1386 has not been assigned to a given user equipment (UE) 201, a call control processor 1387 is informed of the need to page the user equipment (UE) 201. The call control processor 1387 may then direct the Node B 1302 to page the user equipment (UE) 201.

A data source 1389a may include a quantity of data that is to be transmitted to a given user equipment (UE) 201. The data source 1389a provides the data to the packet network interface 1388. The packet network interface 1388 receives the data and routes the data to the selector element 1386. Data received by the packet network interface 1388 from the radio network controller (RNC) 1310 may be sent to a data sink 1389b. A selector element 1386 then transmits the data to the Node B 1302 in communication with the target user equipment (UE) 201. Each Node B 1302 may maintain a data queue 1384, which stores the data to be transmitted to the user equipment (UE) 201.

For each data packet, the channel element 1383 inserts the necessary control fields. The channel element 1383 may perform a cyclic redundancy check (CRC) encoding of the data packet and control fields and insert a set of code tail bits. The data packet, control fields, CRC parity bits and code tail bits may form a formatted packet. The channel element 1383 may then encode the formatted packet and interleave (or reorder) the symbols within the encoded packet. The interleaved packet may be covered with a Walsh code and spread with the short PNI and PNQ codes. The spread data is provided to an RF unit 1385 which quadrature modulates, filters and amplifies the signal. The downlink signal is transmitted over the air through an antenna to the downlink.

The Node B 1302 may include a control unit 1382 for controlling data flows on the Node B 1302. The control unit 1382 may interface with memory 1380 and instructions 1381a/data 1381b stored on the memory 1380.

At the user equipment (UE) 202, the downlink signal is received by an antenna and routed to a receiver. The receiver filters, amplifies, quadrature demodulates and quantizes the signal. The digitized signal is provided to a demodulator (DEMOD), where it is despread with the short PNI and PNQ codes and decovered with the Walsh cover. The demodulated data is provided to a decoder which performs the inverse of the signal processing functions done at Node B 1302, specifically the de-interleaving, decoding and CRC check functions. The decoded data is provided to a data sink 1389b.

Figure 14:
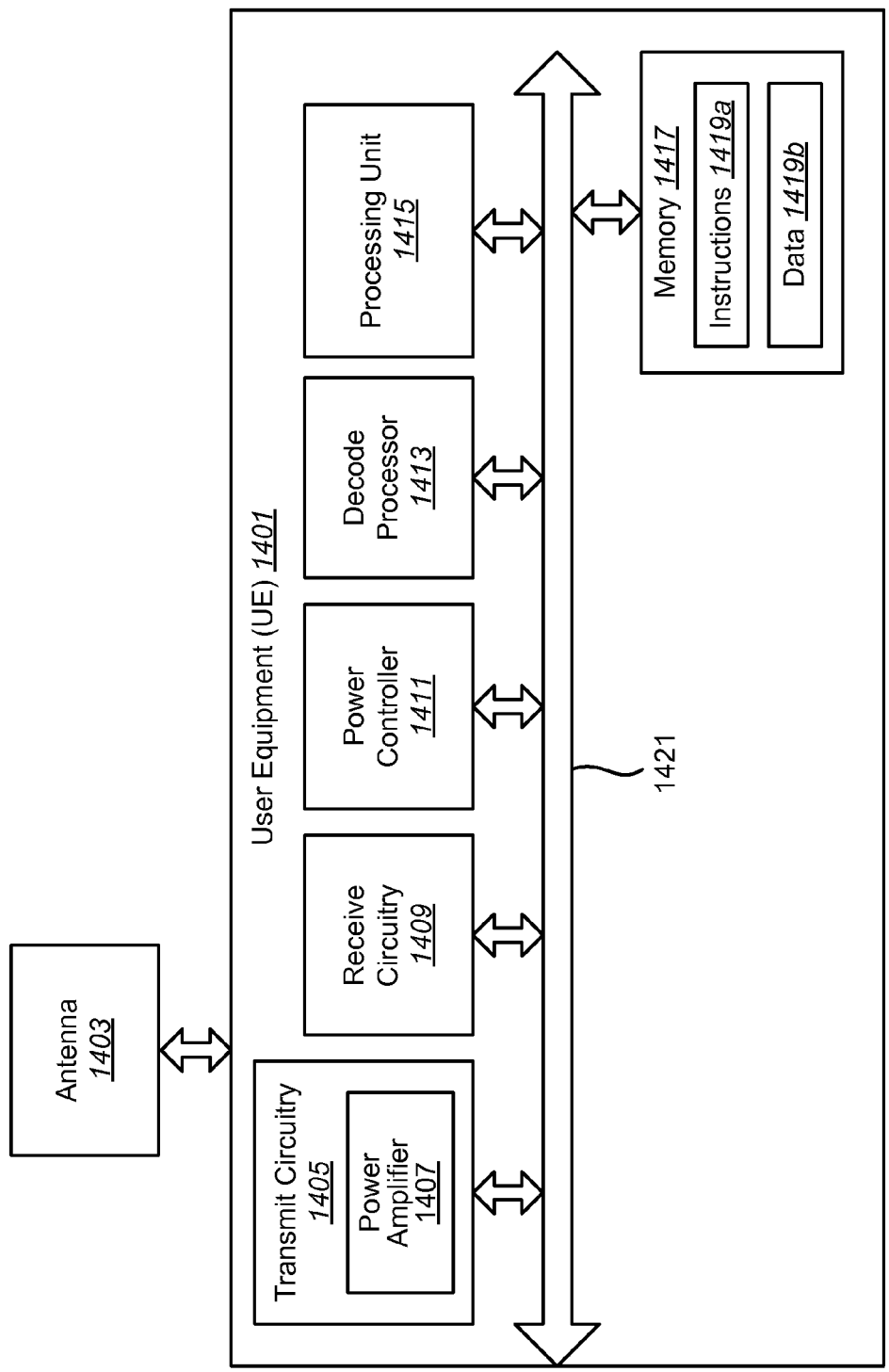
FIG. 14 illustrates a user equipment (UE) for use in the present systems and methods.

FIG. 14 illustrates a user equipment (UE) 1401 for use in the present systems and methods. The user equipment (UE) 1401 includes transmit circuitry 1405 (including a power amplifier 1407), receive circuitry 1409, a power controller 1411, a decode processor 1413, a processing unit 1415 for use in processing signals and memory 1417. The transmit circuitry 1405 and receive circuitry 1409 may allow transmission and reception of data, such as audio communications, between the user equipment (UE) 1401 and a remote location. The transmit circuitry 1405 and receive circuitry 1409 may be coupled to an antenna 1403.

The processing unit 1415 controls operation of the user equipment (UE) 1401. The processing unit 1415 may also be referred to as a CPU. Memory 1417, which may include both read-only memory (ROM) and random access memory (RAM), provides instructions 1419a and data 1419b to the processing unit. A portion of the memory 1417 may also include non-volatile random access memory (NVRAM).

The various components of the user equipment (UE) 1401 are coupled together by a bus system 1421 which may include a power bus, a control signal bus and a status signal bus in addition to a data bus. However, for the sake of clarity, the various busses are illustrated in FIG. 14 as the bus system 1421.

The steps of the methods discussed may also be stored as instructions 1381a in the form of software or firmware located in memory 1380 in the Node B 1302 of FIG. 13. These instructions 1381a may be executed by the control unit 1382 of the Node B 1302. Alternatively, or in conjunction, the steps of the methods discussed may be stored as instructions 1419a in the form of software or firmware located in memory 1417 in the user equipment (UE) 1401. These instructions 1419a may be executed by the processing unit 1415 of the user equipment (UE) 1401.

Figure 15:
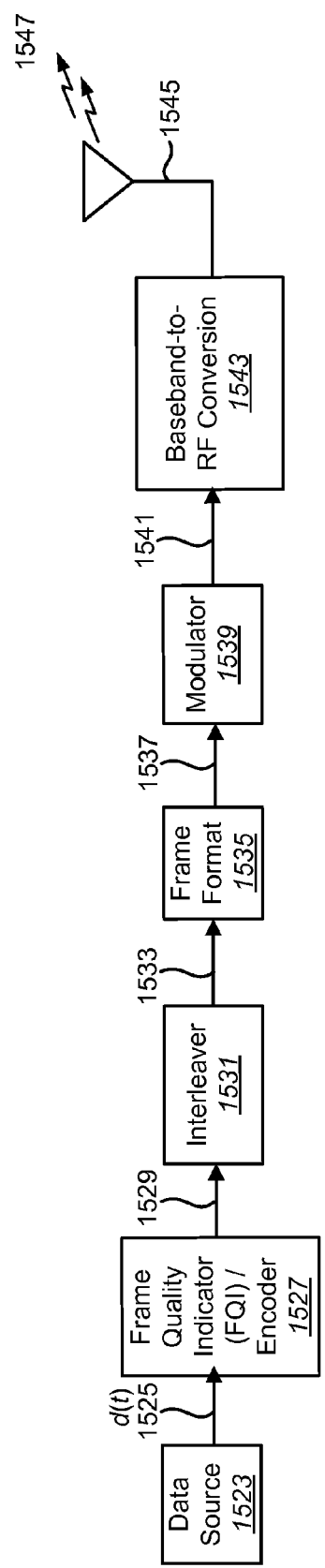
FIG. 15 illustrates an example of a transmitter structure and/or process, which may be implemented in a user equipment (UE).

FIG. 15 illustrates an example of a transmitter structure and/or process, which may be implemented in a user equipment (UE) 201. The functions and components shown in FIG. 15 may be implemented by software, hardware or a combination of software and hardware. Other functions may be added to FIG. 15 in addition to or instead of the functions shown in FIG. 15.

In FIG. 15, a data source 1523 provides data d(t) 1525 to a frame quality indicator (FQI)/encoder 1527. The frame quality indicator (FQI)/encoder 1527 may append a frame quality indicator (FQI) such as cyclic redundancy check (CRC) to the data d(t) 1525. The frame quality indicator (FQI)/encoder 1527 may further encode the data 1525 and FQI using one or more coding schemes to provide encoded symbols 1529. Each coding scheme may include one or more types of coding, e.g., convolutional coding, Turbo coding, block coding, repetition coding, other types of coding or no coding at all. Other coding schemes may include automatic repeat request (ARQ), hybrid ARQ (H-ARQ) and incremental redundancy repeat techniques. Different types of data may be encoded with different coding schemes.

An interleaver 1531 interleaves the encoded data symbols 1529 in time to combat fading, and generates symbols 1533. The interleaved symbols 1533 may be mapped by a frame format block 1535 to a pre-defined frame format to produce a frame 1537. In one configuration, a frame format may specify the frame 1537 as being composed of a plurality of sub-segments. In another configuration, sub-segments may be any successive portions of a frame along a given dimension, e.g., time, frequency, code or any other dimension. A frame 1537 may be composed of a fixed plurality of such sub-segments, each sub-segment containing a portion of the total number of symbols 1533 allocated to the frame 1537. For example, in the W-CDMA standard, a sub-segment may be defined as a slot. In the cdma2000 standard, a sub-segment may be defined as a power control group (PCG). The interleaved symbols 1533 may be segmented into a plurality S of sub-segments making up a frame 1537.

In certain implementations, a frame format may further specify the inclusion of, for example, control symbols (not shown) along with the interleaved symbols 1533. Such control symbols may include, for example, power control symbols, frame format information symbols, etc.

A modulator 1539 modulates the frame 1537 to generate modulated data 1541. Examples of modulation techniques include binary phase shift keying (BPSK) and quadrature phase shift keying (QPSK). The modulator 1539 may also repeat a sequence of modulated data. A baseband-to-radio-frequency (RF) conversion block 1543 may convert the modulated signal 1541 to RF signals for transmission via an antenna 1545 as a signal 1547 over a wireless communication link to one or more Node B 1302 station receivers.

The functions described herein may be implemented in hardware, software, firmware or any combination thereof. If implemented in software, the functions may be stored as one or more instructions on a computer-readable medium. The term "computer-readable medium" or "computer program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 5 and 8, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for using a flexible size radio link control (RLC) protocol data unit (PDU) on an uplink, comprising:
   means for receiving a request for an RLC PDU from a medium access control (MAC) layer;
   means for determining radio conditions for a first uplink carrier and a second uplink carrier;
   means for selecting a size of the RLC PDU based on the radio conditions, wherein the selected size of the RLC PDU is a function of the radio conditions for the first uplink carrier and the radio conditions for the second uplink carrier;
   means for generating the RLC PDU;
   means for determining whether the RLC PDU is to be transmitted via the first uplink carrier or the second uplink carrier; and
   means for sending the RLC PDU to the MAC layer.

2. The apparatus of claim 1, further comprising means for transmitting the RLC PDU via the determined uplink carrier.

3. The apparatus of claim 1, further comprising means for determining a size of a physical layer packet data field.

4. The apparatus of claim 1, wherein the apparatus is a wireless communication device.

5. The apparatus of claim 4, further comprising means for determining whether the wireless communication device is capable of forming an RLC PDU at a given transmission time interval (TTI) with enhanced dedicated channels (EDCH) Transport Format Combination (E-TFC) selection.

6. The apparatus of claim 5, wherein the wireless communication device is capable of forming an RLC PDU at a given TTI with E-TFC selection, and wherein the size of the RLC PDU is selected to match a packet size determined by the E-TFC.

7. The apparatus of claim 5, wherein the wireless communication device is not capable of forming an RLC PDU at a given TTI with E-TFC selection, and further comprising means for determining whether a size of a pre-generated RLC PDU for a later TTI is based on channel conditions and grants.

8. The apparatus of claim 7, wherein the size of the pre-generated RLC PDU is based on channel conditions and grants, wherein selecting a size of the RLC PDU comprises selecting the size of the RLC PDU as a function of the radio conditions for the first uplink carrier and the second uplink carrier, and wherein generating the RLC PDU comprises pre-generating the RLC PDU for a future TTI.

9. The apparatus of claim 7, wherein the size of the pre-generated RLC PDU is not based on channel conditions and grants, wherein selecting a size of the RLC PDU comprises selecting the size of the RLC PDU to minimize segmentation and under-utilization, and wherein the means for generating the RLC PDU comprises means for pre-generating the RLC PDU for a future TTI.

10. The apparatus of claim 1, wherein the means for selecting the size of the RLC PDU comprises means for selecting the size of the RLC PDU data field to be equal to the size of the physical layer packet data field minus physical layer headers and MAC layer headers, and wherein the size of the RLC PDU data field is also restricted by the maximum amount of data allowed to be transmitted by an applicable current grant for a current transmission time interval (TTI).

11. The apparatus of claim 10, wherein the means for generating the RLC PDU comprises means for generating one RLC PDU to fit in a MAC PDU.

12. The apparatus of claim 1, wherein the means for selecting the size of the RLC PDU comprises means for selecting a size of a later RLC PDU for a later time unit to match a physical layer packet size of a current time unit.

13. The apparatus of claim 1, wherein the radio conditions comprise channel variations.

14. The apparatus of claim 1, wherein the radio conditions comprise an available grant.

15. The apparatus of claim 5, wherein the E-TFC is a MAC-i/is entity.

16. The apparatus of claim 5, wherein the E-TFC is a MAC-e/es entity.

17. The apparatus of claim 1, wherein the size of the RLC PDU is selected using $K*\min(x1(t), x2(t))$, wherein $x1(t)$ is a packet size corresponding to a serving grant for the first uplink carrier at time t, wherein $x2(t)$ is a packet size corresponding to a serving grant for the second uplink carrier at time t, and wherein K is a constant.

18. An apparatus for using a flexible size radio link control (RLC) protocol data unit (PDU) on an uplink, comprising:
circuitry configured to provide an RLC PDU, comprising:
an RLC PDU packet request receiving module that receives a request for an RLC PDU from a medium access control (MAC) layer;
a radio conditions module that determines radio conditions for a first uplink carrier and a second uplink carrier;
an RLC PDU size module that selects a size of the RLC PDU based on the radio conditions, wherein the selected size of the RLC PDU is a function of the radio conditions for the first uplink carrier and the radio conditions for the second uplink carrier;
an RLC PDU generation module that generates the RLC PDU and also determines whether the RLC PDU is to be transmitted via the first uplink carrier or the second uplink carrier; and
an RLC send module that sends the RLC PDU to the MAC layer.

19. The apparatus of claim 18, wherein the RLC send module transmits the RLC PDU via the determined uplink carrier.

20. The apparatus of claim 18, wherein the RLC PDU size module determines a size of a physical layer packet data field.

21. The apparatus of claim 18, wherein the apparatus is a wireless communication device.

22. The apparatus of claim 21, wherein the RLC PDU generation module determines whether the wireless communication device is capable of forming an RLC PDU at a given transmission time interval (TTI) with enhanced dedicated channels (EDCH) Transport Format Combination (E-TFC) selection.

23. The apparatus of claim 22, wherein the wireless communication device is capable of forming an RLC PDU at a given TTI with E-TFC selection, and wherein the size of the RLC PDU is selected to match a packet size determined by the E-TFC selection.

24. The apparatus of claim 22, wherein the wireless communication device is not capable of forming an RLC PDU at a given TTI with E-TFC selection, and wherein the RLC PDU size module also determines whether a size of a pre-generated RLC PDU is based on channel conditions and grants.

25. The apparatus of claim 24, wherein the size of the pre-generated RLC PDU is based on channel conditions and grants, wherein the RLC PDU size module selects the size of the RLC PDU as a function of the radio conditions for the first uplink carrier and the second uplink carrier, and wherein the RLC PDU generation module pre-generates the RLC PDU for a future TTI.

26. The apparatus of claim 24, wherein the size of the pre-generated RLC PDU is not based on channel conditions and grants, wherein the RLC PDU size module selects the size of the RLC PDU to minimize segmentation and underutilization, and wherein the RLC PDU generation module pre-generates the RLC PDU for a future TTI.

27. The apparatus of claim 18, wherein the RLC PDU size module selects the size of the RLC PDU data field to be equal to the size of the physical layer packet data field minus physical layer headers and MAC layer headers, and wherein the size of the RLC PDU data field is also restricted by the maximum amount of data allowed to be transmitted by an applicable current grant for a current transmission time interval (TTI).

28. The apparatus of claim 22, wherein the E-TFC selection is a MAC-i/is entity.

29. The apparatus of claim 18, wherein the size of the RLC PDU is selected using $K*\min(x1(t), x2(t))$, wherein $x1(t)$ is a packet size corresponding to a serving grant for the first uplink carrier at time t, wherein $x2(t)$ is a packet size corresponding to a serving grant for the second uplink carrier at time t, and wherein K is a constant.

30. A method for using a flexible size radio link control (RLC) protocol data unit (PDU) on an uplink, comprising:
receiving a request for an RLC PDU from a medium access control (MAC) layer;
determining radio conditions for a first uplink carrier and a second uplink carrier;
selecting a size of the RLC PDU based on the radio conditions, wherein the selected size of the RLC PDU a function of the radio conditions for the first uplink carrier and the radio conditions for the second uplink carrier;
generating the RLC PDU;
determining whether the RLC PDU is to be transmitted via the first uplink carrier or the second uplink carrier; and
sending the RLC PDU to the MAC layer.

31. The method of claim 30, further comprising transmitting the RLC PDU via the determined uplink carrier.

32. The method of claim 30, further comprising determining a size of a physical layer packet data field.

33. The method of claim 30, wherein the method is performed by a wireless communication device.

34. The method of claim 33, further comprising determining whether the wireless communication device is capable of forming an RLC PDU at a given transmission time interval (TTI) with enhanced dedicated channels (EDCH) Transport Format Combination (E-TFC) selection.

35. The method of claim 34, wherein the wireless communication device is capable of forming an RLC PDU at a given TTI with E-TFC selection, and wherein the size of the RLC PDU is selected to match a packet size determined by the E-TFC selection.

36. The method of claim 34, wherein the wireless communication device is not capable of forming an RLC PDU at a given TTI with E-TFC selection, and further comprising determining whether a size of a pre-generated RLC PDU is based on channel conditions and grants.

37. The method of claim 36, wherein the size of the pre-generated RLC PDU is based on channel conditions and grants, wherein selecting a size of the RLC PDU comprises selecting the size of the RLC PDU as a function of the radio conditions for the first uplink carrier and the second uplink carrier, and wherein generating the RLC PDU comprises pre-generating the RLC PDU for a future TTI.

38. The method of claim 36, wherein the size of the pre-generated RLC PDU is not based on channel conditions and grants, wherein selecting a size of the RLC PDU comprises selecting the size of the RLC PDU to minimize segmentation and under-utilization, and wherein generating the RLC PDU comprises pre-generating the RLC PDU for a future TTI.

39. The method of claim 30, wherein selecting the size of the RLC PDU comprises selecting the size of the RLC PDU data field to be equal to the size of the physical layer packet data field minus physical layer headers and MAC layer headers, wherein the size of the RLC PDU data field is also restricted by the maximum amount of data allowed to be transmitted by an applicable current grant for a current transmission time interval (TTI).

40. The method of claim 30, wherein selecting the size of the RLC PDU comprises selecting a size of a later RLC PDU for a later time unit to match a physical layer packet size of a current time unit.

41. The method of claim 30, wherein the radio conditions comprise channel variations.

42. The method of claim 30, wherein the radio conditions comprise an available grant.

43. The method of claim 34, wherein the E-TFC is a MAC-i/is entity.

44. The method of claim 34, wherein the E-TFC is a MAC-e/es entity.

45. The method of claim 30, wherein the size of the RLC PDU is selected using $K*\min(x1(t), x2(t))$, wherein $x1(t)$ is a packet size corresponding to a serving grant for the first uplink carrier at time t, wherein $X2(t)$ is a packet size corresponding to a serving grant for the second uplink carrier at time t, and wherein K is a constant.

46. A computer-program product for using a flexible size radio link control (RLC) protocol data unit (PDU) on an uplink, the computer-program product comprising a non-transitory computer-readable medium having instructions thereon, the instructions comprising:
    code for receiving a request for an RLC PDU from a medium access control (MAC) layer;
    code for determining radio conditions for a first uplink carrier and a second uplink carrier;
    code for selecting a size of the RLC PDU based on the radio conditions, wherein the selected size of the RLC PDU is a function of the radio conditions for the first uplink carrier and the radio conditions for the second uplink carrier;
    code for generating the RLC PDU;
    code for determining whether the RLC PDU is to be transmitted via the first uplink carrier or the second uplink carrier; and
    code for sending the RLC PDU to the MAC layer.

47. The computer-program product of claim 46, wherein the size of the RLC PDU is selected using $K*\min(x1(t), x2(t))$, wherein $x1(t)$ is a packet size corresponding to a serving grant for the first uplink carrier at time t, wherein $x2(t)$ is a packet size corresponding to a serving grant for the second uplink carrier at time t, and wherein K is a constant.

48. The computer-program product of claim 46, wherein the computer-program product controls a wireless communication device that is not capable of forming an RLC PDU at a given transmission time interval (TTI) with enhanced dedicated channels Transport Format Combination (E-TFC) selection, and wherein the instructions further comprise code for determining whether a size of a pre-generated RLC PDU is based on channel conditions and grants.

49. The computer-program product of claim 48, wherein the size of the pre-generated RLC PDU is based on channel conditions and grants, wherein code for selecting a size of the RLC PDU comprises code for selecting the size of the RLC PDU as a function of the radio conditions for the first uplink carrier and the second uplink carrier, and wherein code for generating the RLC PDU comprises code for pre-generating the RLC PDU for a future TTI.

50. The computer-program product of claim 48, wherein the size of the pre-generated RLC PDU is not based on channel conditions and grants, wherein code for selecting a size of the RLC PDU comprises code for selecting the size of the RLC PDU to minimize segmentation and under-utilization, and wherein code for generating the RLC PDU comprises code for pre-generating the RLC PDU for a future TTI.

51. A method for using a flexible size radio link control (RLC) protocol data unit (PDU) on an uplink, comprising:
    receiving a request for an RLC PDU from a medium access control (MAC) layer;
    determining radio conditions for a first uplink carrier and a second uplink carrier;
    selecting a size of the RLC PDU based on the radio conditions, wherein the method is performed by a wireless communication device;
    determining whether the wireless communication device is capable of forming an RLC PDU at a given transmission time interval (TTI) with enhanced dedicated channels (EDCH) Transport Format Combination (E-TFC) selection, wherein the wireless communication device is not capable of forming an RLC PDU at a given TTI with E-TFC selection, and further comprising determining whether a size of a pre-generated RLC PDU is based on channel conditions and grants;
    generating the RLC PDU; and
    sending the RLC PDU to the MAC layer.

52. A method for using a flexible size radio link control (RLC) protocol data unit (PDU) on an uplink, comprising:
    receiving a request for an RLC PDU from a medium access control (MAC) layer;
    determining radio conditions for a first uplink carrier and a second uplink carrier;
    selecting a size of the RLC PDU based on the radio conditions, wherein selecting the size of the RLC PDU comprises selecting the size of the RLC PDU data field to be equal to the size of the physical layer packet data field minus physical layer headers and MAC layer headers, wherein the size of the RLC PDU data field is also restricted by the maximum amount of data allowed to be transmitted by an applicable current grant for a current transmission time interval (TTI);
    generating the RLC PDU; and
    sending the RLC PDU to the MAC layer.

53. A method for using a flexible size radio link control (RLC) protocol data unit (PDU) on an uplink, comprising:
    receiving a request for an RLC PDU from a medium access control (MAC) layer;
    determining radio conditions for a first uplink carrier and a second uplink carrier;
    selecting a size of the RLC PDU based on the radio conditions, wherein selecting the size of the RLC PDU comprises selecting a size of a later RLC PDU for a later time unit to match a physical layer packet size of a current time unit;
    generating the RLC PDU; and
    sending the RLC PDU to the MAC layer.

54. A method for using a flexible size radio link control (RLC) protocol data unit (PDU) on an uplink, comprising:
  receiving a request for an RLC PDU from a medium access control (MAC) layer;
  determining radio conditions for a first uplink carrier and a second uplink carrier;
  selecting a size of the RLC PDU based on the radio conditions, wherein the size of the RLC PDU is selected using $K*\min(x1(t), x2(t))$, wherein $x1(t)$ is a packet size corresponding to a serving grant for the first uplink carrier at time t, wherein $X2(t)$ is a packet size corresponding to a serving grant for the second uplink carrier at time t, and wherein K is a constant;
  generating the RLC PDU; and
  sending the RLC PDU to the MAC layer.

* * * * *